US012127231B2

(12) United States Patent
Katayama et al.

(10) Patent No.: US 12,127,231 B2
(45) Date of Patent: Oct. 22, 2024

(54) COMMUNICATION CONTROL APPARATUS, COMMUNICATION CONTROL METHOD AND PROGRAM

(71) Applicant: NIPPON TELEGRAPH AND TELEPHONE CORPORATION, Tokyo (JP)

(72) Inventors: Yohei Katayama, Musashino (JP); Kenji Suzuki, Musashino (JP); Kazumitsu Sakamoto, Musashino (JP); Yosuke Fujino, Musashino (JP); Hiroyuki Fukumoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 390 days.

(21) Appl. No.: 17/440,960

(22) PCT Filed: Mar. 11, 2020

(86) PCT No.: PCT/JP2020/010555
§ 371 (c)(1),
(2) Date: Sep. 20, 2021

(87) PCT Pub. No.: WO2020/195839
PCT Pub. Date: Oct. 1, 2020

(65) Prior Publication Data
US 2022/0225336 A1    Jul. 14, 2022

(30) Foreign Application Priority Data
Mar. 26, 2019    (JP) .................................. 2019-057979

(51) Int. Cl.
*H04W 4/00*    (2018.01)
*H04W 72/541*    (2023.01)

(52) U.S. Cl.
CPC .................................. *H04W 72/541* (2023.01)

(58) Field of Classification Search
CPC ............... H04W 72/541; H04W 72/54; H04W 72/1273; Y02D 30/70
See application file for complete search history.

(56) References Cited

U.S. PATENT DOCUMENTS 10,237,879 B2 *   3/2019  Kim ........................ H04B 7/022
2017/0302337 A1 * 10/2017  Liu ............................ H04L 5/14
(Continued)

FOREIGN PATENT DOCUMENTS

CA   2760109 A1 * 11/2010 ........... H04B 17/345
EP   3761744 A1 *  1/2021 .......... H04W 72/082
(Continued)

OTHER PUBLICATIONS

LoRa Alliance Technical Committee, LoRaWAN 1.1 Specification, Notice of Use and Disclosure, LoRa Alliance, Inc., Oct. 11, 2017, https://lora-alliance.org/sites/default/files/2018-04/lorawantm_specification_-v1.1.pdf.

*Primary Examiner* — Thai D Hoang
(74) *Attorney, Agent, or Firm* — Harness, Dickey & Pierce, P.L.C.

(57) ABSTRACT

A communication control device that transmits a packet to be transmitted to a terminal to a base station that performs wireless communication with the terminal, includes: a terminal classification unit that classifies, on the basis of a magnitude of radio wave interference from a base station different from a neighboring base station, a plurality of the terminals into a first terminal set and a second terminal set that is relatively larger in the magnitude of radio wave interference than the first terminal set; and a transmission unit that transmits, in a case where packets destinations of which are terminals belonging to the first terminal set are to be transmitted to respective neighboring base stations of the (Continued)

terminals, the packets at the same timing and transmits, in a case where packets destinations of which are terminals belonging to the second terminal set are to be transmitted to respective neighboring base stations of the terminals, the packets at timings different from each other.

6 Claims, 32 Drawing Sheets

(56) References Cited

U.S. PATENT DOCUMENTS

2018/0167179 A1 6/2018 Huang et al.
2020/0403759 A1* 12/2020 Abdelghaffar ........ H04L 5/0092

FOREIGN PATENT DOCUMENTS

| JP | H10117373 A | 5/1998 | |
|---|---|---|---|
| JP | 200432202 A | 1/2004 | |
| JP | 2018098751 A | 6/2018 | |
| WO | WO-2006007318 A1 * | 1/2006 | ........... H04L 1/0045 |
| WO | WO-2013091187 A1 * | 6/2013 | ........... H04L 5/0007 |
| WO | WO-2013107139 A1 * | 7/2013 | ........... H04L 5/0007 |
| WO | WO-2015013977 A1 * | 2/2015 | ............ H04W 72/04 |

* cited by examiner

Fig. 14

| GATEWAY | AVERAGE LOSS RATE | TERMINAL ID | AVERAGE LOSS RATE |
|---|---|---|---|
| GATEWAY 20b | 0.01 | ED-1 | 0 |
| | | ED-2 | 0.02 |
| GATEWAY 20g | 0.03 | ED-3 | 0.03 |
| ... | ... | ... | ... |

Fig. 21

| ENTRY NUMBER | INTERFERENCE SOURCE | GATEWAY GROUP | TERMINAL GROUP (QUEUE TYPE) |
|---|---|---|---|
| 1 | NO | R, G, B | rr, gg, bb |
| 2 | YES | B | br, bg, brg |
| 3 | | R | rb, rg, rgb |
| 4 | | G | gr, gb, gbr |

Fig. 25

| ENTRY NUMBER | n | GATEWAY GROUP | | TERMINAL GROUP (QUEUE TYPE) |
|---|---|---|---|---|
| | | STOPPED | TRANSMISSION | |
| 1 | 0 | NO | R, G, B | rr, gg, bb |
| 2 | 1 | R | G, B | gr, br |
| 3 | | G | R, B | rg, bg |
| 4 | | B | G, R | gb, rb |
| 5 | 2 | R, G | B | brg |
| 6 | | G, B | R | rgb |
| 7 | | B, R | G | gbr |

| ENTRY NUMBER | GATEWAY GROUP | | TERMINAL GROUP (QUEUE TYPE) |
|---|---|---|---|
| | STOPPED | TRANSMISSION | |
| 1 | NO | R, G, B, C | rr, gg, bb, cc |
| 2 | R | G | gr |
| ... | ... | ... | ... |
| 6 | R, C | B | brc |
| ... | ... | ... | ... |

| ENTRY NUMBER | GATEWAY GROUP | | TERMINAL GROUP (QUEUE TYPE) |
|---|---|---|---|
| | STOPPED | TRANSMISSION | |
| 1 | NO | R, G, B, C | rr, gg, bb, cc |
| 2' | R, C | G, B | gr, brc |
| ... | ... | ... | ... |

| ENTRY NUMBER | n | GATEWAY GROUP | | TERMINAL GROUP (QUEUE TYPE) | |
|---|---|---|---|---|---|
| | | LOW-POWERED | HIGH-POWERED | LOW-POWERED | HIGH-POWERED |
| 1 | 0 | NO | R, G, B | NO | rr, gg, bb |
| 2 | 1 | R | G, B | rr | gr, br |
| 3 | | G | R, B | gg | rg, bg |
| 4 | | B | G, R | bb | gb, rb |
| 5 | 2 | R, G | B | rr, gg | brg |
| 6 | | G, B | R | gg, bb | rgb |
| 7 | | B, R | G | bb, rr | gbr |

D13

COMMUNICATION CONTROL APPARATUS, COMMUNICATION CONTROL METHOD AND PROGRAM

CROSS-REFERENCE TO RELATED APPLICATIONS

This application is a 371 U.S. National Phase of International Application No. PCT/JP2020/010555 filed on Mar. 11, 2020, which claims priority to Japanese Application No. 2019-057979 filed on Mar. 26, 2019. The entire disclosures of the above applications are incorporated herein by reference.

TECHNICAL FIELD

The present invention relates to a communication control device, a communication control method, and a program.

BACKGROUND ART

An example of a communication scheme LPWA (Low Power, Wide Area), which is a wireless communication technology enabling a wide range to be a target at a low power consumption, is LoRa (R) (see Non-Patent Literature 1). According to LoRa (R), for example, a control device (server) communicates with LPWA-compatible terminals (hereinafter, referred to as "LPWA terminals") via a plurality of gateways. The LPWA terminals each perform a receiving operation on the basis of a reception timing notified from a gateway (a base station) by a beacon. In a case where a normal reception fails, data is retransmitted with further collision avoided by randomizing a transmission timing.

CITATION LIST

Non-Patent Literature

Non-Patent Literature 1: "LoRaWAN (R) 1.1 Specification", [online] the LoRa Alliance Technical Committee, Oct. 11, 2017, [Searched on March 25, Heisei 31], the Internet <URL:https://lora-alliance.org/sites/default/files/2018-04/lorawantm_specification_-v1.1.pdf>

SUMMARY OF THE INVENTION

Technical Problem

In a case where a plurality of gateways are operated at the same frequency and geographically close ones of the gateways have a cell-overlapping area (hereinafter, referred to as "overlapping area") therebetween, radio wave interference (hereinafter, also referred to simply as "interference") occurs in the overlapping area. Thus, simultaneous transmission of data from a server to a large number of LPWA terminals would result in frequent occurrence of collision of packets in the overlapping area. In this case, the data is frequently retransmitted from the server to the LPWA terminals, which increases an amount of time required before all the LPWA terminals complete the reception of data.

The present invention has been made in view of such circumstances and an object thereof is to provide a technology enabling reducing an amount of time required for communication between a server and a terminal.

Means for Solving the Problem

An aspect of the present invention is a communication control device that transmits a packet to be transmitted to a terminal to a base station that performs wireless communication with the terminal, the communication control device including: a terminal classification unit that classifies, on the basis of a magnitude of radio wave interference from a base station different from a neighboring base station, a plurality of the terminals into a first terminal set and a second terminal set that is relatively larger in the magnitude of radio wave interference than the first terminal set; and a transmission unit that transmits, in a case where packets destinations of which are terminals belonging to the first terminal set are to be transmitted to respective neighboring base stations of the terminals, the packets at the same timing and transmits, in a case where packets destinations of which are terminals belonging to the second terminal set are to be transmitted to respective neighboring base stations of the terminals, the packets at timings different from each other.

In addition, an aspect of the present invention is the above-described communication control device further including a base station classification unit that groups base stations that cause no radio wave interference with each other together, in which in the case where the packets the destinations of which are the terminals belonging to the second terminal set are to be transmitted to the respective neighboring base stations of the terminals, the transmission unit transmits the packets at different timings for grouped base station sets.

In addition, an aspect of the present invention is the above-described communication control device further including a base station classification unit that groups base stations that cause no radio wave interference with each other together, in which in the case where the packets the destinations of which are the terminals belonging to the second terminal set are to be transmitted to the respective neighboring base stations of the terminals, when transmitting no packet to a base station belonging to a first base station set, the transmission unit transmits a packet a destination of which is a terminal that suffers radio wave interference from the base station belonging to the first base station set.

In addition, an aspect of the present invention is a communication control device that transmits a packet to be transmitted to a terminal to a base station that performs wireless communication with the terminal, the communication control device including: a first terminal classification unit that classifies, on the basis of a magnitude of radio wave interference from a base station different from a neighboring base station, a plurality of the terminals into a first terminal set and a second terminal set that is relatively larger in the magnitude of radio wave interference than the first terminal set; a second terminal classification unit that classifies, on the basis of a received signal intensity of a radio wave from the neighboring base station, a plurality of terminals included in the first terminal set into a third terminal set and a fourth terminal set that is relatively higher in the received signal intensity than the third terminal set; a transmission power control unit that reduces, in a case where a packet a destination of which is a terminal belonging to the fourth terminal set is to be transmitted, a transmission power for a radio wave from the neighboring base station of the terminal; and a transmission unit that transmits, in a case where packets destinations of which are terminals belonging to the third terminal set are to be transmitted to respective neighboring base stations of the terminals, the packets at the same timing and transmits, in a case where packets destinations of which are terminals belonging to the second terminal set are to be transmitted to respective neighboring base stations of the terminals, the packets at timings different from each other while transmitting packets destinations of which are terminals belonging to the fourth terminal set to respective neighboring base stations of the terminals.

In addition, an aspect of the present invention is the above-described communication control device, in which the transmission unit changes intervals of transmission of the packets in accordance with at least one of a communication quality during the wireless communication or the magnitude of radio wave interference between the base stations.

In addition, an aspect of the present invention is a communication control method of transmitting a packet to be transmitted to a terminal to a base station that performs wireless communication with the terminal, the communication control method including: a terminal classification step of classifying, on the basis of a magnitude of radio wave interference from a base station different from a neighboring base station, a plurality of the terminals into a first terminal set and a second terminal set that is relatively larger in the magnitude of radio wave interference than the first terminal set; and a transmission step of transmitting, in a case where packets destinations of which are terminals belonging to the first terminal set are to be transmitted to respective neighboring base stations of the terminals, the packets at the same timing and transmits, in a case where packets destinations of which are terminals belonging to the second terminal set are to be transmitted to respective neighboring base stations of the terminals, the packets at timings different from each other.

In addition, an aspect of the present invention is a communication control method of transmitting a packet to be transmitted to a terminal to a base station that performs wireless communication with the terminal, the communication control method including: a first terminal classification step of classifying, on the basis of a magnitude of radio wave interference from a base station different from a neighboring base station, a plurality of the terminals into a first terminal set and a second terminal set that is relatively larger in the magnitude of radio wave interference than the first terminal set; a second terminal classification step of classifying, on the basis of a received signal intensity of a radio wave from the neighboring base station, a plurality of terminals included in the first terminal set into a third terminal set and a fourth terminal set that is relatively higher in the received signal intensity than the third terminal set; a transmission power control step of reducing, in a case where a packet a destination of which is a terminal belonging to the fourth terminal set is to be transmitted, a transmission power for a radio wave from the neighboring base station of the terminal; and a transmission step of transmitting, in a case where packets destinations of which are terminals belonging to the third terminal set are to be transmitted to respective neighboring base stations of the terminals, the packets at the same timing and transmits, in a case where packets destinations of which are terminals belonging to the second terminal set are to be transmitted to respective neighboring base stations of the terminals, the packets at timings different from each other while transmitting packets destinations of which are terminals belonging to the fourth terminal set to respective neighboring base stations of the terminals.

In addition, an aspect of the present invention is a program for causing a computer to function as the communication control device Effects of the Invention According to the present invention, it is possible to reduce an amount of time required for communication between a server and a terminal.

BRIEF DESCRIPTION OF DRAWINGS

FIG. 14 shows a configuration of a communication quality recording database D4 used by the server 10 according to the first embodiment of the present invention.

FIG. 21 shows a configuration of a terminal group extraction table D9 used by the server 10 according to the first embodiment of the present invention.

FIG. 25 shows a configuration of a terminal group extraction table D10 used by the server 10 according to the second embodiment of the present invention.

FIG. 27 shows a configuration of a terminal group extraction table D11 used by the server 10 according to the second embodiment of the present invention.

FIG. 28 shows a configuration of a terminal group extraction table D12 used by the server 10 according to the second embodiment of the present invention.

FIG. 32 shows a configuration of a terminal group extraction table D13 used by the server 10 according to the third embodiment of the present invention.

DESCRIPTION OF EMBODIMENTS

First Embodiment

Description will be made below on a first embodiment of the present invention with reference to the drawings.
[Configuration of Communication Control System]
Description will be made below on a configuration of a communication control system 1.

Figure 1:
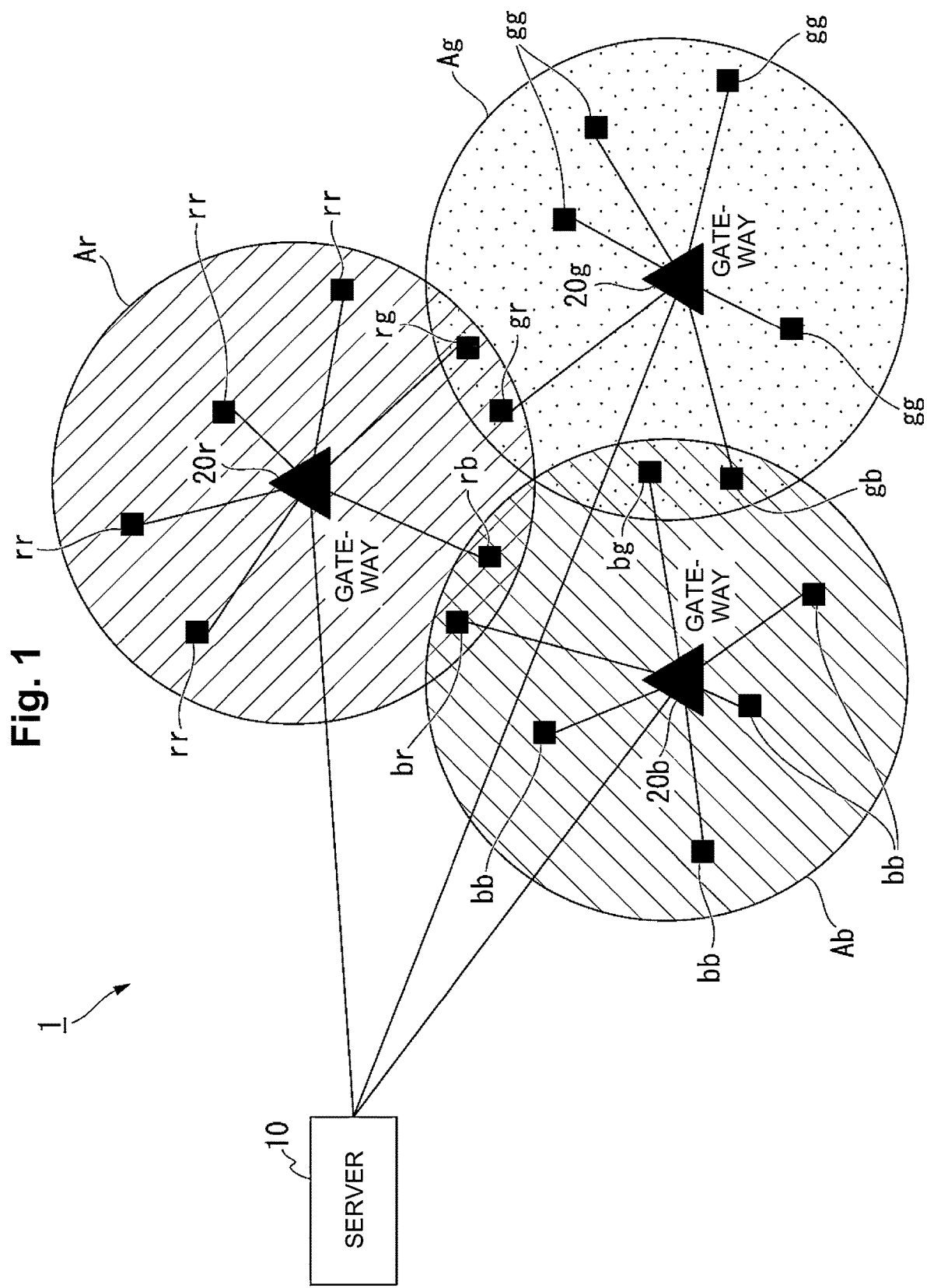
FIG. 1 shows an example of an overall configuration of a communication control system 1 according to a first embodiment of the present invention.

FIG. 1 shows an example of an overall configuration of the communication control system 1 according to the first embodiment of the present invention.

As shown in FIG. 1, the communication control system 1 includes a server 10, a gateway 20b, a gateway 20g, a gateway 20r, and a plurality of terminals (bb, bg, br, gg, gb, gr, rr, rb, and rg). The gateway 20b, the gateway 20g, and the gateway 20r are hereinafter referred to simply as "gateways 20" unless it is necessary to distinguish among them. Further, the plurality of terminals shown in FIG. 1 are classified as follows.

The terminal bb, a neighboring base station of which is the gateway 20b, is a terminal located within a range of only a cell defined by the gateway 20b. The terminal bb is thus a terminal not affected by interference (or a terminal less affected by interference) from any gateway other than the gateway 20b (the neighboring base station).

The terminal bg, a neighboring base station of which is the gateway 20b, is a terminal located within an overlapping range between the range of the cell defined by the gateway 20b and a range of a cell defined by the gateway 20g. The terminal bg is thus a terminal that is likely to be affected by interference from the gateway 20g.

The terminal br, a neighboring base station of which is the gateway 20b, is a terminal located within an overlapping range between the range of the cell defined by the gateway 20b and a range of a cell defined by the gateway 20r. The terminal br is thus a terminal that is likely to be affected by interference from the gateway 20r.

The terminal gg, a neighboring base station of which is the gateway 20g, is a terminal located within a range of only a cell defined by the gateway 20g. The terminal gg is thus a terminal not affected by interference (or a terminal less affected by interference) from any gateway other than the gateway 20g (the neighboring base station).

The terminal gb, a neighboring base station of which is the gateway 20g, is a terminal located within an overlapping range between the range of the cell defined by the gateway 20g and the range of the cell defined by the gateway 20b. The terminal gb is thus a terminal that is likely to be affected by interference from the gateway 20b.

The terminal gr, a neighboring base station of which is the gateway 20g, is a terminal located within an overlapping range between the range of the cell defined by the gateway 20g and the range of the cell defined by the gateway 20r. The terminal gr is thus a terminal that is likely to be affected by interference from the gateway 20r.

The terminal rr, a neighboring base station of which is the gateway 20r, is a terminal located within a range of only a cell defined by the gateway 20r. The terminal rr is thus a terminal not affected by interference (or a terminal less affected by interference) from any gateway other than the gateway 20r (the neighboring base station).

The terminal rb, a neighboring base station of which is the gateway 20r, is a terminal located within an overlapping range between the range of the cell defined by the gateway 20r and the range of the cell defined by the gateway 20b. The terminal rb is thus a terminal that is likely to be affected by interference from the gateway 20b.

The terminal rg, a neighboring base station of which is the gateway 20r, is a terminal located within an overlapping range between the range of the cell defined by the gateway 20r and the range of the cell defined by the gateway 20g. The terminal rg is thus a terminal that is likely to be affected by interference from the gateway 20g.

The terminal bb, the terminal gg, and the terminal rr, which are terminals not affected by interference (or less affected by interference) from any base station other than the neighboring base stations, are hereinafter referred to collectively as "non-interference terminals". Further, the terminal bg, the terminal br, the terminal gb, the terminal gr, the terminal rb, and the terminal rb, which are terminals likely to be affected by interference from any base station other than the neighboring base stations, are hereinafter referred to collectively as "interference terminals". Further, the terminal bb, the terminal gg, the terminal rr, the terminal bg, the terminal br, the terminal gb, the terminal gr, the terminal rb, and the terminal rb are hereinafter referred to simply as "terminals" unless it is necessary to distinguish among them (in other words, it is not necessary to distinguish between the "non-interference terminals" and the "interference terminals").

The server 10 is, for example, an information processing device such as a general-purpose computer. The server 10 is communicatively connected to the terminals via the gateways 20 to transmit and receive data. The server 10 has a communication control function to control a transmission timing at which data is to be transmitted to the terminals via the gateways 20. It should be noted that a transmission/ reception function and the communication control function for data may be implemented in the form of devices independent of each other.

The gateways 20, which are relays that relay communication between the server 10 and each of the terminals, each function as a base station that communicates with the terminals. The gateways 20 and the terminals are communicatively connected by wireless communication (for example, an LPWA communication scheme such as LoRa (R)). For downstream communication from the gateways 20 to the terminals, the same frequency is used for all of the gateways 20. It should be noted that the server 10 and each of the gateways 20 may be communicatively connected by wireless communication or may be communicatively connected by wire communication.

It should be noted that compared with a communication speed of communication between the server 10 and the gateways 20, a communication speed between the gateways 20 and the terminals is slow. This frequently causes a situation where the plurality of gateways 20 overlap each other in terms of radio wave sending time. Therefore, in a case where a radio wave for downstream communication is sent to any of the interference terminals located in the overlapping areas between the cells of adjacent ones of the plurality of gateways 20, interference frequently occurs. In particular, during simultaneous communication in terminal control requiring responses from the terminals to the server, packets for downstream communication are frequently retransmitted from the server 10 to the interference terminals.

Figure 2:
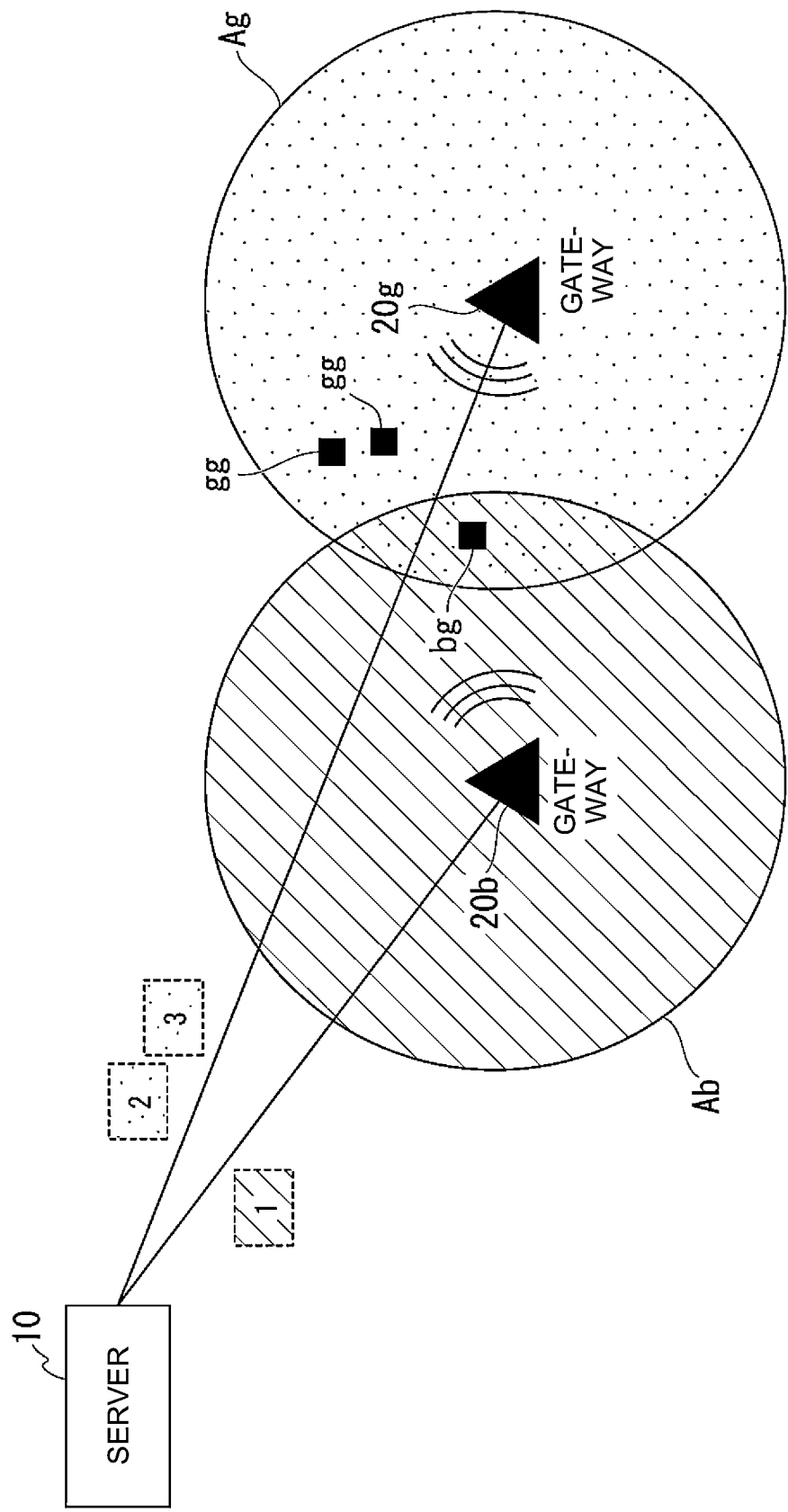
FIG. 2 is a diagram of assistance in explaining an example of a case where radio wave interference and packet retransmission occur.

Description will be made below on an example of a case where radio wave interference and packet retransmission occur with reference to FIG. 2 and FIG. 3. As shown in FIG. 2, packets to be transmitted from the server 10 via the gateway 20b to the terminal bg, which is one of the interference terminals, include a packet "1". Further, packets to be transmitted from the server 10 via the gateway 20g to the terminal gg, which is one of the non-interference terminals, include a packet "2" and a packet "3". It should be noted that the numbers assigned to these packets represent the order of transmission from the server.

Figure 3:
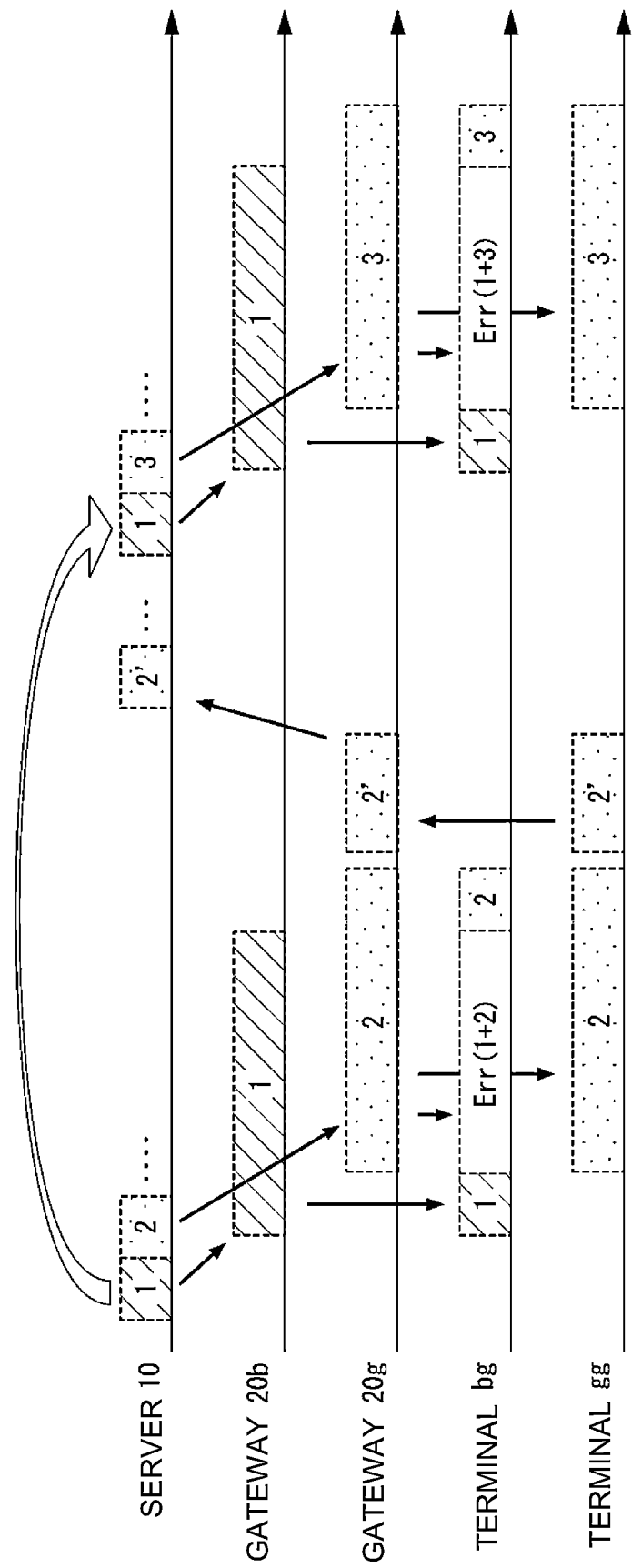
FIG. 3 is a diagram of assistance in explaining the example of the case where radio wave interference and packet retransmission occur.

In this case, for example, radio wave interference and packet retransmission as shown in FIG. 3 are likely to occur. In FIG. 3, an abscissa axis represents time. First, the server 10 transmits the packet "1" to the gateway 20b. After completing the transmission of the packet "1", the server 10 subsequently transmits the packet "2" to the gateway 20g.

When receiving the packet "1", the gateway 20b transmits this packet "1" to the terminal bg. Likewise, when receiving the packet "2", the gateway 20g transmits this packet "2" to the terminal gg. It should be noted that compared with the communication speed communication between the server 10 and the gateways 20, the communication speed between the gateways 20 and the terminals is slow as described above. Thus, in FIG. 3, an amount of time required to transmit a packet from the gateways 20 to the terminals is longer than an amount of time required to transmit a packet from the server 10 to the gateways 20 even though the packets are the same.

The terminal bg starts receiving the packet "1". Likewise, the terminal gg starts receiving the packet "2". Here, the terminal bg is the interference terminal that suffers interference from the gateway 20g. Thus, as shown in FIG. 3, when the gateway 20g starts transmitting the packet "2", a reception error (in FIG. 3, an "Err (1 +2)" spot) occurs in the terminal bg due to interference. Consequently, the terminal bg fails to receive the packet "1" and cannot return an ACK (Acknowledge; positive response) signal to the server 10.

Meanwhile, the terminal gg, which is the non-interference terminal, does not suffer interference from the gateway 20b. Thus, as shown in FIG. 3, the terminal gg can normally receive the packet "2", returning an ACK signal to the server 10 via the gateway 20g (in FIG. 3, a "2'" spot). The server 10 then receives the ACK signal.

Next, since having received no ACK signal in response to the packet "1" transmitted to the terminal bg, the server 10 retransmits another packet "1" to the gateway 20b. When completing the retransmission of the packet "1", the server 10 subsequently transmits the packet "3" to the gateway 20g, since the ACK signal has been received in response to the packet "2".

When receiving the packet "1", the gateway 20b transmits this packet "1" to the terminal bg again. Likewise, when receiving the packet "3", the gateway 20g transmits this packet "3" to the terminal gg.

The terminal bg starts receiving the packet "1". Likewise, the terminal gg starts receiving the packet "3". Here, as shown in FIG. 3, when the gateway 20g starts transmitting the packet "3", a reception error (in FIG. 3, an "Err (1+3)" spot) occurs again in the terminal bg due to interference. Consequently, the terminal bg again fails to receive the packet "1" and cannot return an ACK signal to the server 10.

As described above, in a case where a radio wave for downstream communication is sent to any of the interference terminals located in the overlapping areas between the respective cells defined by the plurality of gateways 20 adjacent to each other, a packet for downstream communication is likely to be frequently retransmitted to the interference terminal due to the frequent occurrence of interference.

A communication method according to the first embodiment will be described below in comparison with a typical communication method.

Figure 4:
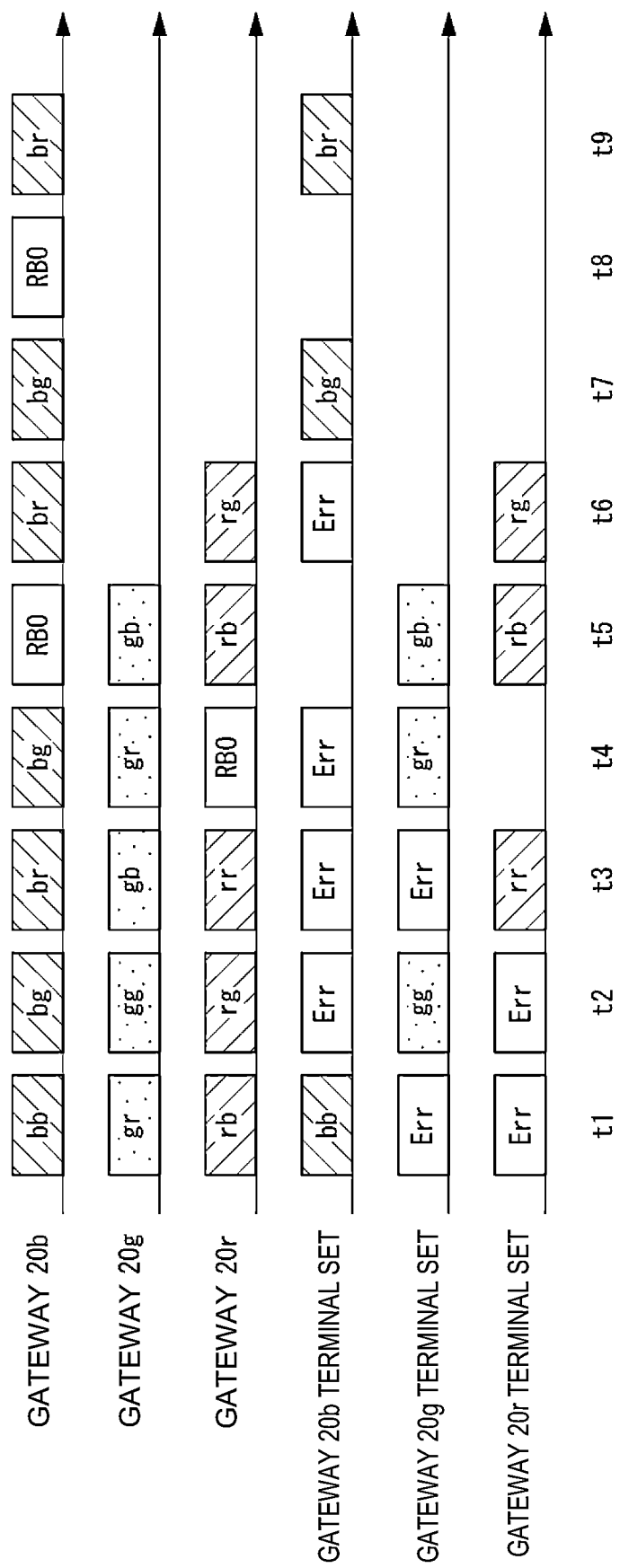
FIG. 4 is a diagram of assistance in explaining a typical communication method.

FIG. 4 is a diagram of assistance in explaining a typical communication method. In FIG. 4, an abscissa axis represents time. Further, in FIG. 4, "bb", "bg", "br", "gg", "gb", "gr", "rr", "rb", and "rg" denote packets to be transmitted from the gateways 20 to terminal sets or packets to be received by the terminal sets. For example, "bb" shown on a time axis of the gateway 20b denotes a packet to be transmitted to the terminal bb and "bg" denotes a packet to be transmitted to the terminal bg. Further, "bb" shown on a time axis of a gateway 20b terminal set denotes a packet to be received by the terminal bb and "bg" denotes a packet to be received by the terminal bg.

Further, in FIG. 4, "RBO" denotes a duration when communication between the gateways 20 and the terminals is suspended due to the randomization of the transmission timing and "Err" denotes the occurrence of a reception error.

As shown in FIG. 4, in the typical communication method, at a time tl, the gateway 20b, the gateway 20g, and the gateway 20r first simultaneously transmit packets to the terminal bb, the terminal gr, and the terminal rb, respectively. In this case, the packet "bb", which is transmitted to one of the non-interference terminals, the terminal bb, suffers no interference, thus being normally received by the terminal bb. Meanwhile, the packet "gr", which is transmitted to one of the interference terminals, the terminal gr, suffers interference from the gateway 20r, thus causing the terminal gr to have a reception error ("Err"). Likewise, the packet "rb", which is transmitted to one of the interference terminals, the terminal rb, suffers interference from the gateway 20*b*, thus causing the terminal rb to have a reception error ("Err").

Subsequently, as shown in FIG. 4, at a time t2, the gateway 20*b*, the gateway 20*g*, and the gateway 20*r* simultaneously transmit packets to the terminal bg, the terminal gg, and the terminal rg, respectively. In this case, the packet "gg", which is transmitted to one of the non-interference terminals, the terminal gg, suffers no interference, thus being normally received by the terminal gg. Meanwhile, the packet "bg", which is transmitted to one of the interference terminals, the terminal bg, suffers interference from the gateway 20*g*, thus causing the terminal bg to have a reception error ("Err"). Likewise, the packet "rg", which is transmitted to one of the interference terminals, the terminal rg, suffers interference from the gateway 20*g*, thus causing the terminal rg to have a reception error ("Err").

Further, the above applies to a time t3 and the subsequent times as shown in FIG. 4. As is understood from the above, the typical communication method is likely to frequently cause reception errors.

Figure 5:
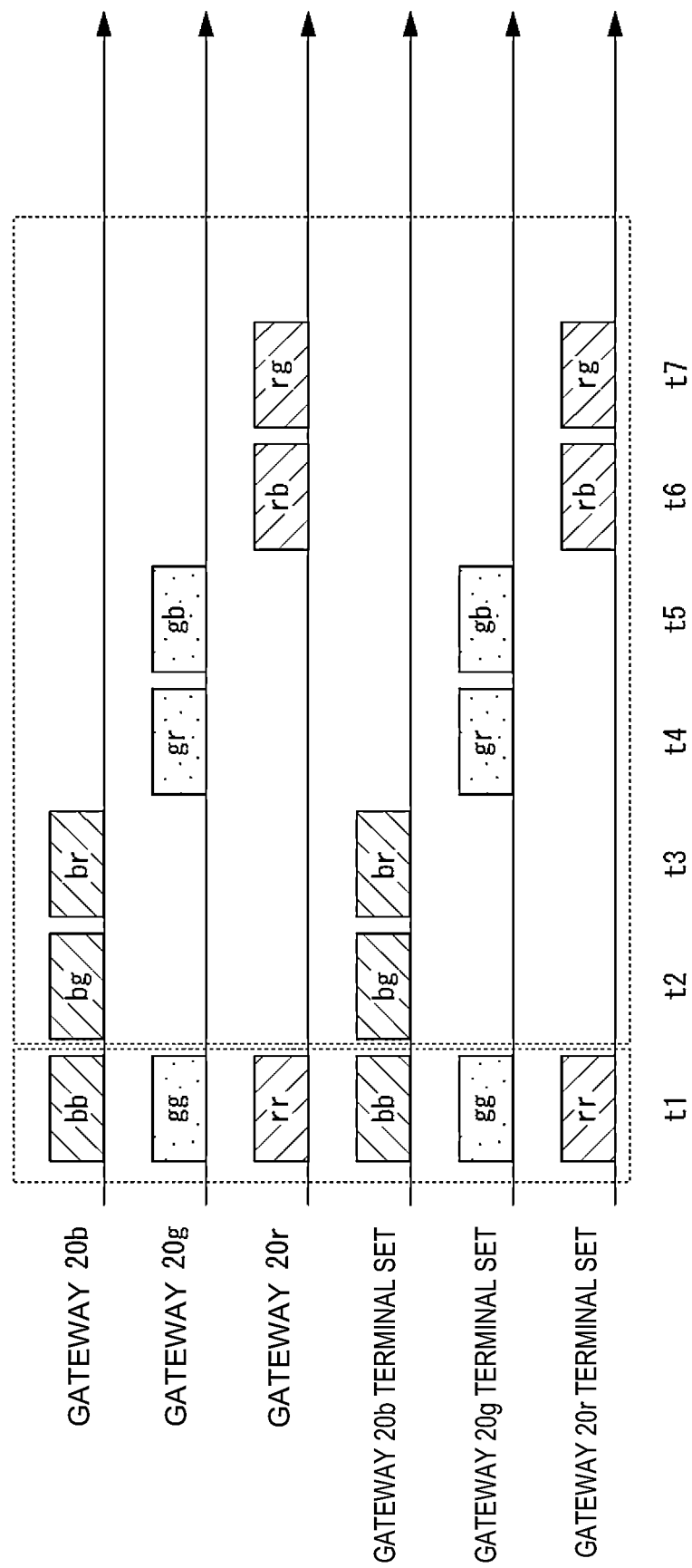
FIG. 5 is a diagram of assistance in explaining a communication method according to the first embodiment of the present invention.

In contrast, FIG. 5 is a diagram of assistance in explaining the communication method according to the first embodiment of the present invention. The server 10 according to the first embodiment first classifies all the target terminals into the non-interference terminals and the interference terminals. Then, for example, at the time tl, the server 10 simultaneously transmits packets to be transmitted to the non-interference terminals to the gateways 20. For example, as shown in FIG. 5, the server 10 simultaneously transmits the packet "bb", which is to be transmitted to one of the non-interference terminals, the terminal bb, to the gateway 20*b*, the packet "gg", which is to be transmitted to another one of the non-interference terminals, the terminal gg, to the gateway 20*g*, and the packet "rr", which is to be transmitted to still another one of the non-interference terminals, the terminal rr, to the gateway 20*r*. It should be noted that since all the packets transmitted at the time t1 are packets to be transmitted to the non-interference terminals, no interference occurs at each of the terminals.

Next, the server 10 transmits packets to be transmitted to the interference terminals to the gateways 20. In this regard, in transmitting the packets to the interference terminals, the server 10 transmits the packets according to a schedule instead of simultaneously transmitting the packets to the gateways 20.

For example, as shown in FIG. 5, at the time t2, the server 10 transmits the packet "bg", which is to be transmitted to one of the interference terminals that communicate with the gateway 20*b*, namely, the terminal bg, to the gateway 20*b*. At the time t2, the server 10 transmits no packet to any other gateway 20 (i.e., the gateway 20*g* and the gateway 20*r*). Thus, no radio wave is sent from the gateway 20*g* at the same timing, so that the terminal bg can receive the packet "bg" without being affected by interference from the gateway 20*g*.

Subsequently, at the time t3 to a time t7, the server 10 transmits the packets to be transmitted to the interference terminals to the respective gateways 20 in sequence, while at the same timing as the timing at which each of these packets is transmitted, transmitting no packet to any other gateway 20 that is likely to cause interference as described above. This allows each of the interference terminals to receive a desired packet without being affected by interference.

As described above, the server 10 according to the first embodiment can make radio wave interference unlikely to occur, allowing for reducing the frequency of the retransmission of packets. This makes communication between the server 10 and each of the terminals more efficient.

Figure 6:
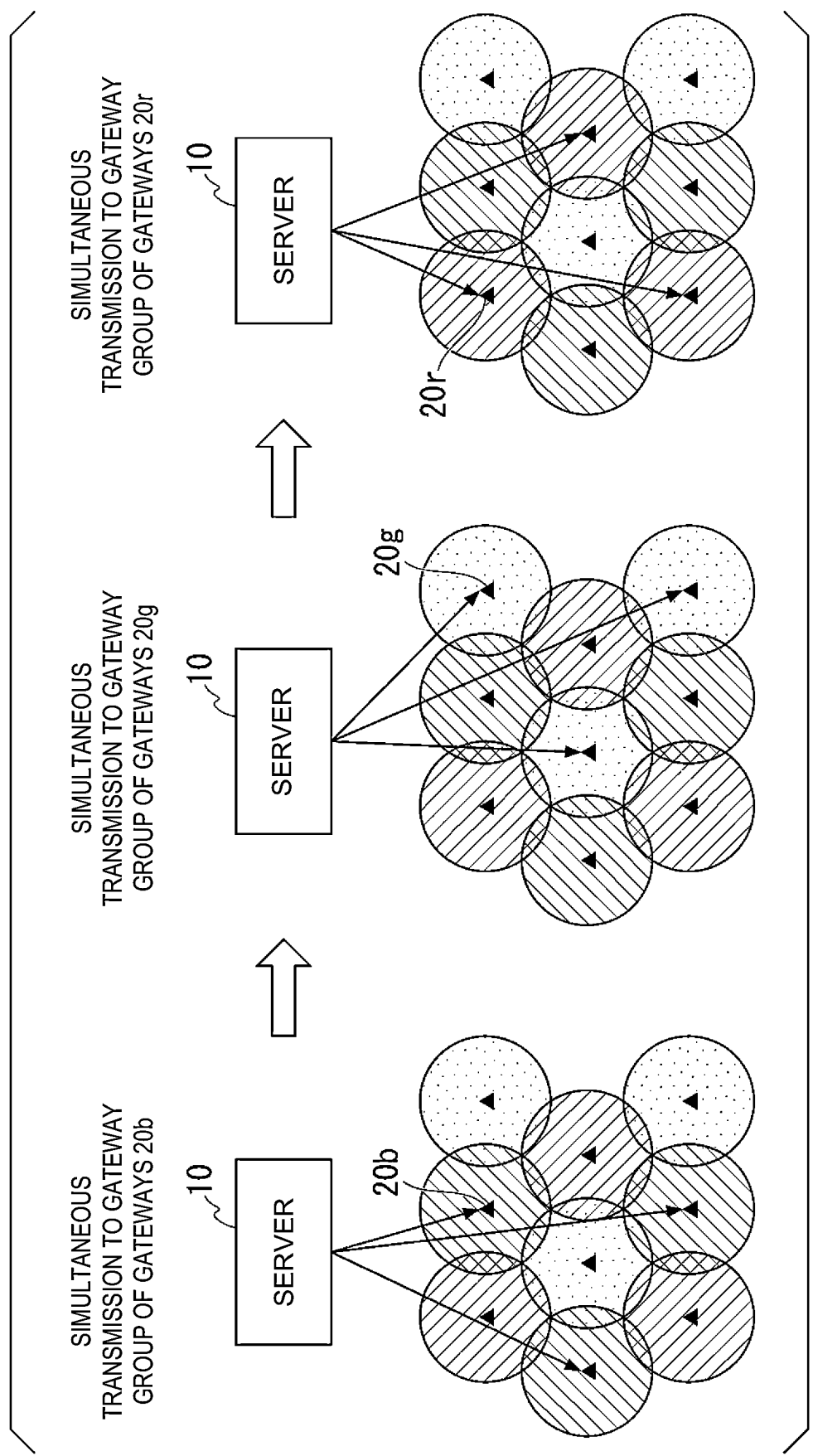
FIG. 6 is a diagram of assistance in explaining a configuration where packets are simultaneously transmitted on a gateway-group basis.

It should be noted that the number of the gateways 20 is usually not three but larger. Accordingly, for example, as shown in FIG. 6, the server 10 classifies the large number of gateways 20 into a gateway group of gateways 20*b*, a gateway group of gateways 20*g*, and a gateway group of gateways 20*r* on the basis of a position relationship between the ranges of the cells. Then, for example, the server 10 first simultaneously transmits packets to the gateway group of gateways 20*b*, simultaneously transmits packets to the gateway group of gateways 20*g* at the next transmission timing, and simultaneously transmits the gateway group of gateways 20*r* at the timing after the next.

[Functional Configuration of Server]

Description will be made below on a functional configuration of the server 10.

Figure 7:
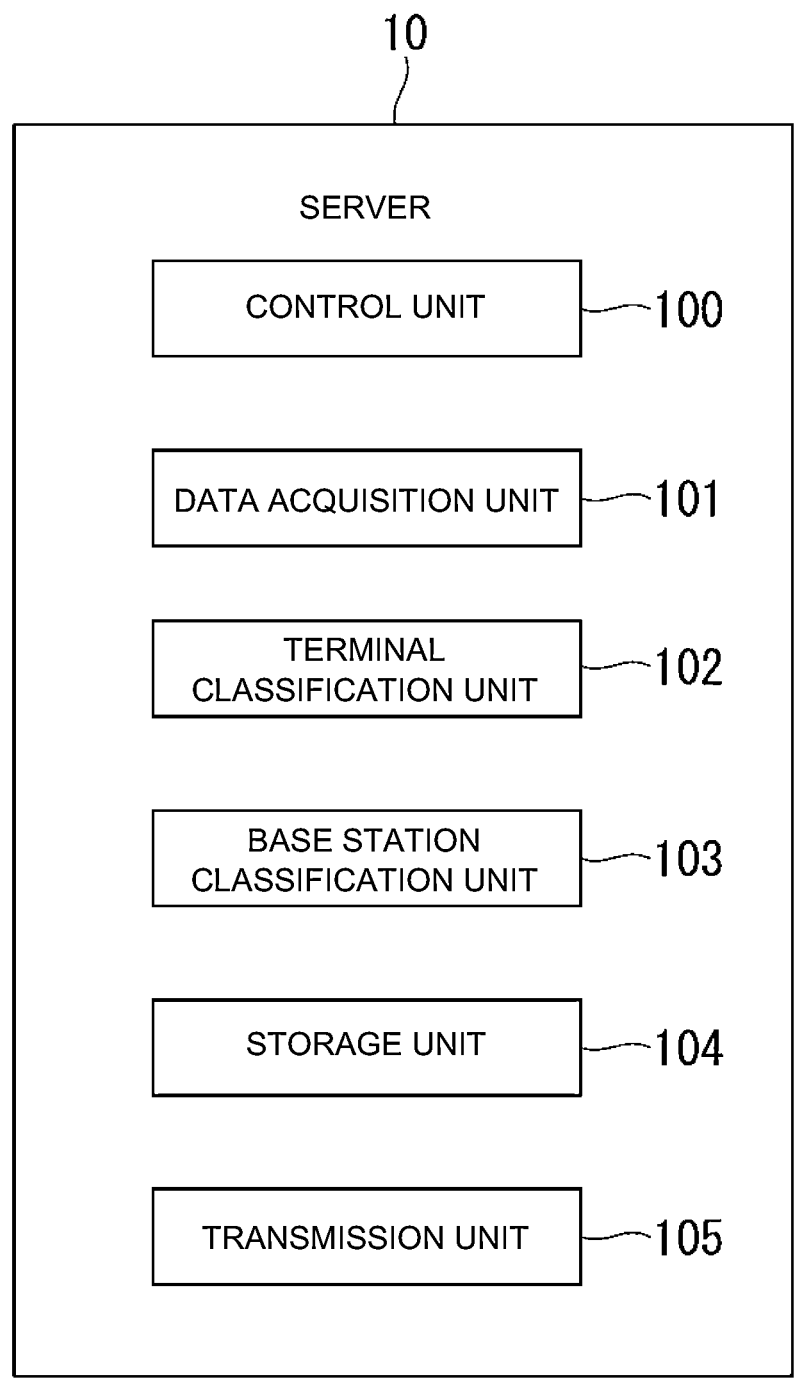
FIG. 7 is a block diagram showing a functional configuration of a server 10 according to the first embodiment of the present invention.

FIG. 7 is a block diagram showing the functional configuration of the server 10 according to the first embodiment of the present invention.

The server 10 is a communication control device that transmits a packet to be transmitted to a terminal to the gateway 20 (the neighboring base station) that performs wireless communication with the terminal. The server 10 is, for example, an information processing device such as a general-purpose computer as described above. As shown in FIG. 7, the server 10 includes a control unit 100, a data acquisition unit 101, a terminal classification unit 102, a base station classification unit 103, a storage unit 104, and a transmission unit 105.

The control unit 100 controls operations of functional units of the server 10. For example, the control unit 100 includes a processor such as a CPU (Central Processing Unit). It should be noted that, for example, the processor of the control unit 100 reads and executes a software program stored in the storage unit 104, thereby implementing the functional units of the server 10.

The data acquisition unit 101 acquires data for performing transmission to terminals from, for example, an external device or the like. The data acquisition unit 101 causes the storage unit 104 to store the acquired data.

The terminal classification unit 102 classifies, on the basis of the magnitude of radio wave interference from each of the gateways 20 (the base stations) different from the opposing gateway 20 (the neighboring base station), transmission targets, i.e., a plurality of terminals, into a first terminal group (a first terminal set: a terminal group of non-interference terminals) that is relatively smaller in magnitude of radio wave interference and a second terminal group (a second terminal set: a terminal group of non-interference terminals) that is relatively larger in magnitude of radio wave interference than the first terminal group. The terminal classification unit 102 causes the storage unit 104 to store information regarding the classified terminal groups.

The base station classification unit 103 groups the gateways 20 (the base stations) that cause no radio wave interference with each other together. The base station classification unit 103 causes the storage unit 104 to store information regarding the grouped gateways 20.

The storage unit 104 temporarily stores data to be transmitted to the terminals. The storage unit 104 also stores the information regarding the classified terminal groups and the information regarding the grouped gateways 20 (the base station groups). The storage unit 104 includes, for example, a storage medium such as a RAM (Random Access Memory; a readable and writable memory), a flush memory, an EEPROM (Electrically Erasable Programmable Read Only Memory), or an HDD (Hard Disk Drive) or any combination of these storage media.

The transmission unit 105 acquires, from the storage unit 104, data to be transmitted to the terminals. The transmission unit 105 then transmits packets by a different transmission method for each of the destinations of the packets (i.e., each of the terminal groups classified by the terminal classification unit 102). In a case where packets the destinations of which are the terminals belonging to the above-described first terminal group are to be transmitted to the respective gateways 20 (neighboring base stations) neighboring these terminals, the transmission unit 105 simultaneously transmits the packets at the same timing.

Further, in a case where packets the destinations of which are the terminals belonging to the above-described second terminal group are to be transmitted to the respective gateways 20 (neighboring base stations) neighboring these terminals, the transmission unit 105 transmits the packets at timings different from each other. Further, in the case where packets the destinations of which are the terminals belonging to the above-described second terminal group are to be transmitted to the respective gateways 20 (neighboring base stations) neighboring these terminals, the transmission unit 105 transmits the packets at different timings for the base station groups grouped by the base station classification unit 103.

It should be noted that the transmission unit 105 includes, in addition to the functions that control the transmission of the packets as described above, a coding device that encodes data to be transmitted to the terminals and a communication interface (or an antenna) for communicative connection to the gateways 20.

[Flow of Terminal Group Update Processing]

Description will be made below on an example of a flow of processing for updating the terminal groups.

Figure 8:
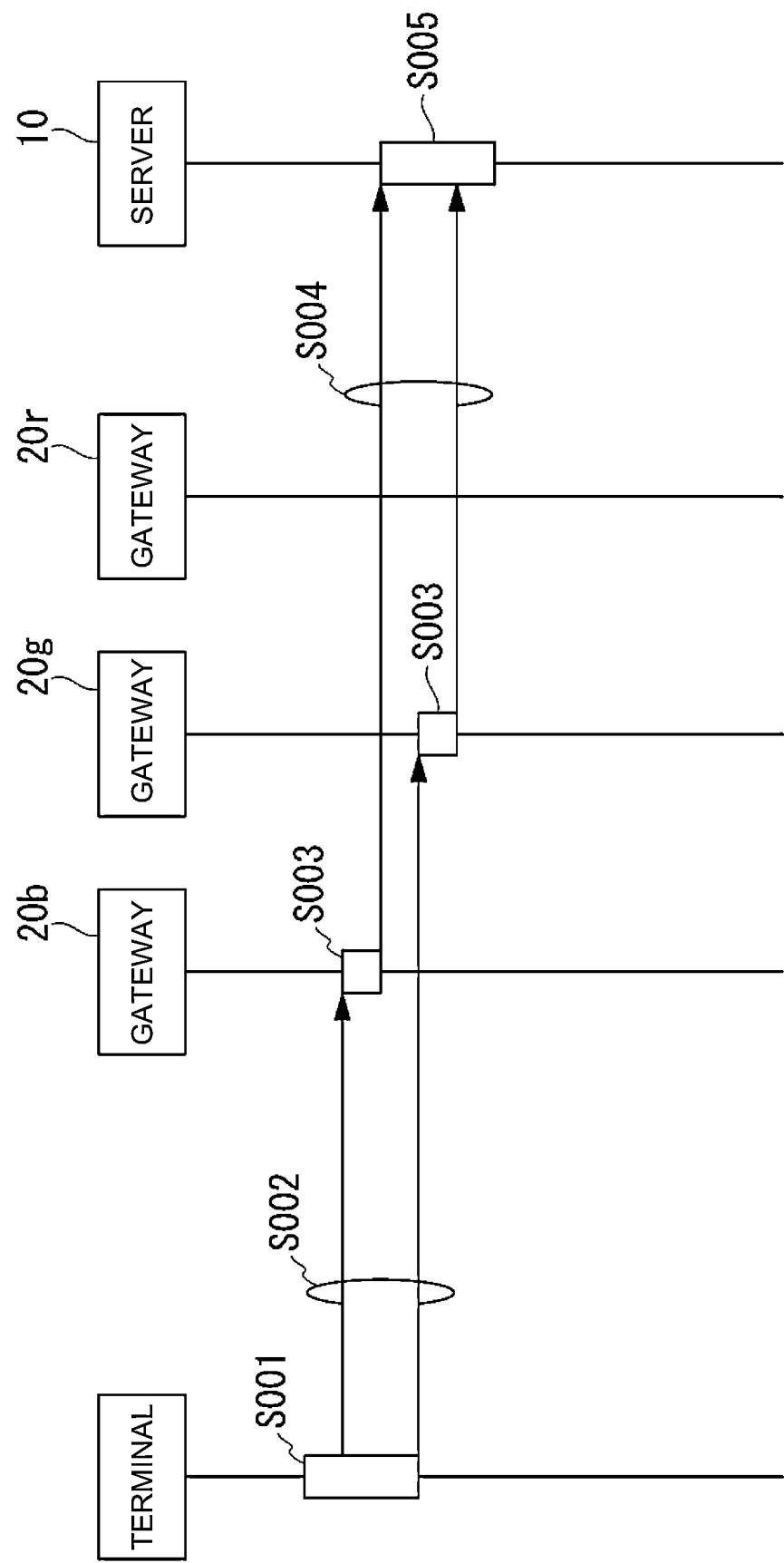
FIG. 8 is a sequence diagram showing update of terminal classification performed by the communication control system 1 according to the first embodiment of the present invention.

FIG. 8 is a sequence diagram showing update of the terminal groups performed by the communication control system 1 according to the first embodiment of the present invention. It should be noted that FIG. 8 shows a flow of terminal group update processing to be performed in a case where a terminal that will be affected by radio waves transmitted from the gateway 20*b* and the gateway 20*g* is classified.

As shown in FIG. 8, the terminal is first started (step S001). When the terminal is started, the terminal outputs communication data for upstream communication (or a signal indicating a participation request) to a wireless system, trying to be communicatively connected to the wireless system (step S002). In an example shown in FIG. 8, the outputted communication data is received by two of the gateways 20, the gateway 20*b* and the gateway 20*g* (step S003).

When receiving the communication data outputted from the terminal, the gateway 20*b* and the gateway 20*g* each transmit information indicating a received signal intensity upon reception to the server 10 along with the communication data (step S004). The server 10 receives the communication data and the information indicating the received signal intensity upon reception transmitted from each of the gateway 20*b* and the gateway 20*g*. The server 10 then updates the terminal groups on the basis of the received information indicating the received signal intensity and updates topology information regarding network topology (step S005).

[Detail of Terminal Group Update Processing]

A further detailed description will be made below on an example of the terminal group update processing performed by the server 10 in step S005 described above.

Figure 9:
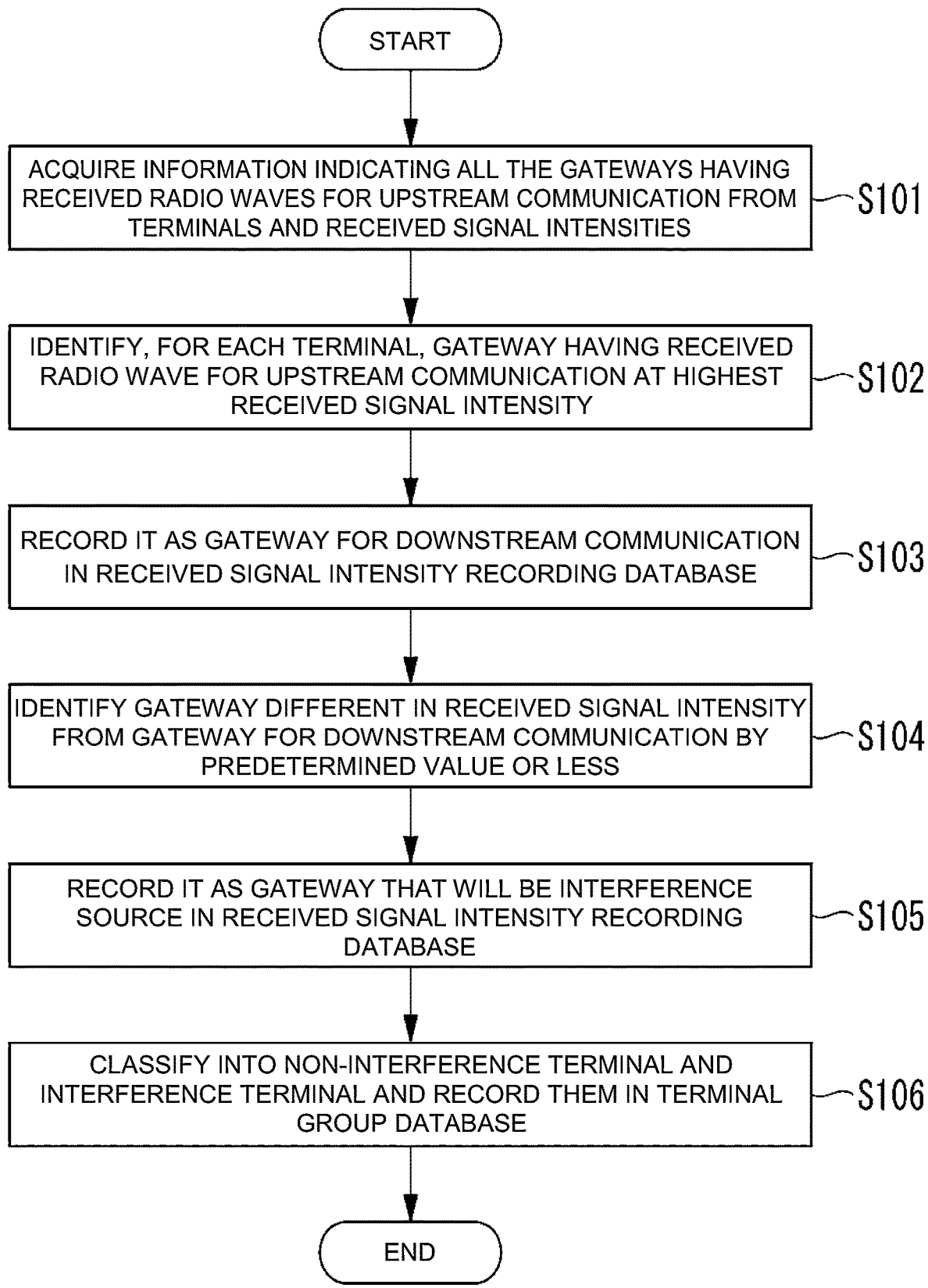
FIG. 9 is a flowchart showing an operation for terminal group update processing performed by the server 10 according to the first embodiment of the present invention.

FIG. 9 is a flowchart showing an operation for the terminal group update processing performed by the server 10 according to the first embodiment of the present invention.

The terminal classification unit 102 of the server 10 acquires information indicating all the gateways 20 (the gateway 20*b* and the gateway 20*g* in FIG. 8) having received radio waves for upstream communication from the terminals and information indicating the received signal intensity upon reception (step S101). The terminal classification unit 102 identifies one of the gateways 20 having received the radio wave from each of the terminals at the highest received signal intensity on the basis of the acquired information (step S102). The terminal classification unit 102 then records the identified gateway 20 as a gateway for downstream communication to the terminal in a database (hereinafter, referred to as "received signal intensity recording database") stored in the storage unit 104 (step S103). It should be noted that a table configuration of the received signal intensity recording database will be described later.

The terminal classification unit 102 identifies any other gateway 20 having a received signal intensity that is different from the received signal intensity of the above-described identified gateway 20 for downstream communication by a predetermined value or less (for example, 10 [dB] or less) on the basis of the information indicating all the gateways 20 having received the radio waves for upstream communication from the terminals and the information indicating the received signal intensity upon reception (step S104). When identifying any other the gateway 20 that satisfies the above-described condition, the terminal classification unit 102 records the identified gateway 20 as a gateway that will be an interference source in a received signal intensity recording database Dl (step S105).

The terminal classification unit 102 classifies the terminals into a terminal group (the first terminal group) of non-interference terminals, that is, terminals for which no gateway 20 that will be an interference source during downstream communication exists, and a terminal group (the second terminal group) of interference terminals, that is, terminals for which the gateways 20 that will be interference sources during downstream communication exist on the basis of the received signal intensity recording database D1. The terminal classification unit 102 then records information indicating the terminals belonging to each of the terminal groups in a database (hereinafter, referred to as "terminal group database") stored in the storage unit 104. It should be noted that a table configuration of the terminal group database will be described later.

The operation of the terminal classification unit 102 of the server 10 shown in the flowchart of FIG. 9 thus terminates.

[Configuration of Received Signal Intensity Recording Database]

Figure 10:
FIG. 10 shows a configuration of a received signal intensity recording database D1 used by the server 10 according to the first embodiment of the present invention.

Description will be made below on an example of the table configuration of the received signal intensity recording database D1. FIG. 10 shows the configuration of the received signal intensity recording database D1 used by the server 10 according to the first embodiment of the present invention.

As shown in FIG. 10, the received signal intensity recording database D1 is data in the form of a table in which a terminal ID (Identifier), information indicating the gateway 20 for downstream communication and the received signal intensity thereof, and information indicating the gateway 20 that will be an interference source and the received signal intensity thereof are associated with each other. It should be noted that the information indicating the gateway 20 for downstream communication and the received signal intensity thereof is the information recorded in step S103 described above. Meanwhile, the information indicating the gateway 20 that will be an interference source and the received signal intensity thereof is the information recorded in step S105 described above.

As shown in FIG. 10, for example, the gateway 20b is associated as the gateway for downstream communication with a terminal with a terminal-identifying terminal ID of "ED-1" (hereinafter, referred to as "terminal ED-1"). Further, "−80 [dB]" is associated as a value indicating the received signal intensity of a radio wave from the gateway 20b at the terminal ED-1. Further, no gateway that will be an interference source is associated with the terminal ED-1. Further, as shown in FIG. 10, for example, the gateway 20g is associated as the gateway for downstream communication with a terminal with a terminal-identifying terminal ID of "ED-3" (hereinafter, referred to as "terminal ED-3"). Further, "−95 [dB]" is associated as a value indicating the received signal intensity of a radio wave from the gateway 20g at the terminal ED-3. Further, the gateway 20b is associated as the gateway that will be an interference source with the terminal ED-1. Further, "−102 [dB]" is associated as a value indicating the received signal intensity of a radio wave from the gateway 20b at the terminal ED-3.

[Configuration of Terminal Group Database]

Description will be made below on an example of the table configuration of a terminal group database D2.

Figure 11:
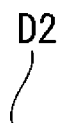
FIG. 11 shows a configuration of a terminal group database D2 used by the server 10 according to the first embodiment of the present invention.

FIG. 11 shows the configuration of the terminal group database D2 used by the server 10 according to the first embodiment of the present invention.

As shown in FIG. 11, the terminal group database D2 is data in the form of a table in which information indicating a terminal group and the terminal ID are associated with each other. It should be noted that the information indicating the terminal group and the terminal ID are the information recorded in step S106 described above.

As shown in FIG. 11, the terminal group includes a terminal group of "non-interference terminals" and a terminal group of "interference terminals". Further, as shown in FIG. 11, terminal IDs such as "ED-1" are associated with the terminal group of "non-interference terminals" and terminal IDs such as "ED-2" and "ED-3" are associated with the terminal group of "interference terminals".

[Simultaneous Communication Control by Server]

Description will be made below on an example of simultaneous communication control processing performed by server 10.

Figure 12:
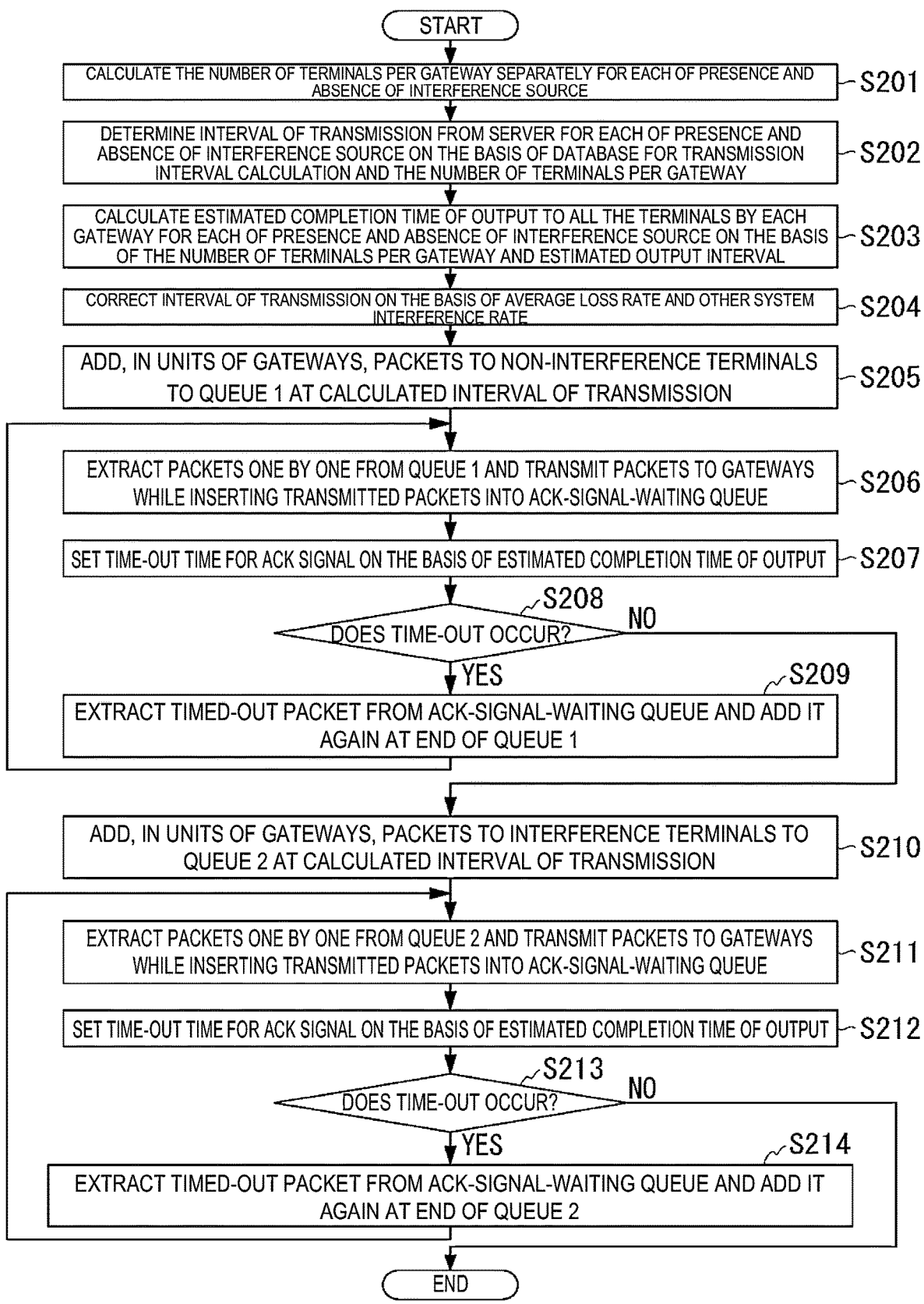
FIG. 12 is a flowchart showing an operation for simultaneous communication control processing performed by the server 10 according to the first embodiment of the present invention.

FIG. 12 is a flowchart showing an operation for the simultaneous communication control processing performed by the server 10 according to the first embodiment of the present invention.

The transmission unit 105 of the server 10 calculates, on the basis of the above-descried received signal intensity recording database Dl (for example, see FIG. 10), the number of terminals that perform downstream communication from each of the gateways 20 (i.e., the number of terminals per gateway 20) for each of the presence and the absence of the gateway 20 that will be an interference source (step S201). Then, the transmission unit 105 determines, on the basis of a database for calculating an interval between times of transmission of packets from the transmission unit 105 during downstream communication (hereinafter, referred to as "database for transmission interval calculation") and the calculated number of terminals per gateway 20, an interval of transmission to each of the gateways 20 for each of the presence and the absence of the gateway 20 that will be an interference source (step S202). It should be noted that a table configuration of the database for transmission interval calculation will be described later.

The transmission unit 105 calculates, on the basis of the calculated number of terminals per gateway 20 and an estimated output interval recorded in a database for transmission interval calculation D3, an estimated time of completion of output to all the terminals by each of the gateways 20 for each of the presence and the absence of the gateway 20 that will be an interference source (step S203).

The transmission unit 105 corrects, on the basis of an average loss rate recorded in a database that records communication qualities of the terminals and the gateways 20 (hereinafter, referred to as "communication quality recording database") and a value of another system interference rate recorded in a database that records other system interference of each of the gateways 20 (hereinafter, referred to as "other system interference recording database"), the interval of transmission to each of the gateways 20 (step S204). For example, an input interval may be corrected by multiplying the input interval by 1/(1—average loss rate) or 1/(1—other system interference rate). It should be noted that table configurations of the communication quality recording database and the other system interference recording database will be described later.

The transmission unit 105 adds, in units of the gateways 20, packets for downstream communication to the non-interference terminals to a queue 1 at the interval of transmission calculated above (step S205). The transmission unit 105 extracts the packets for downstream communication to the gateways 20 from the queue 1 one by one. Then, the transmission unit 105 simultaneously transmits the extracted packets to the gateways 20 in parallel. Further, at the same time, the transmission unit 105 inserts the transmitted packet into an ACK-signal-waiting queue (step S206).

The transmission unit 105 sets a time-out time for ACK signals on the basis of the estimated time of completion of output and waits for ACK signals to all the packets (step S207). Here, in a case where the time-out time for ACK signals elapses and time-out occurs (step S208.Yes), the transmission unit 105 extracts the packet having been timed out from the ACK-signal-waiting queue and adds the packet again at an end of the above-described queue 1 (step S209). Then, the process returns again to step S205 described above.

In a case where ACK signals to all the packets for downstream communication to the non-interference terminals are received (step S208.No), the transmission unit 105 adds, in units of the gateways 20, packets for downstream communication to the interference terminals to a queue 2 at the interval of transmission calculated above (step S210). The transmission unit 105 extracts the packets for downstream communication to each of the gateways 20 from the queue 2 one by one. Then, the transmission unit 105 simultaneously transmits the extracted packets to the gateways 20 in parallel. Further, at the same time, the transmission unit 105 inserts the transmitted packet into the ACK-signal-waiting queue (step S211).

The transmission unit 105 sets a time-out time for ACK signals on the basis of the estimated time of completion of output and waits for ACK signals to all the packets (step S212). Here, in a case where the time-out time for ACK signals elapses and time-out occurs (step S213.Yes), the transmission unit 105 extracts the packet having been timed out from the ACK-signal-waiting queue and again adds the packet at an end of the above-described queue 2 (step S214). Then, the process returns again to step S210 described above.

When ACK signals to all the packets for downstream communication to the interference terminals are received (step S213.No), the operation of transmission unit 105 of the server 10 shown in the flowchart of FIG. 12 terminates.

[Configuration of Database for Transmission Interval Calculation]

Description will be made below on an example of the table configuration of the database for transmission interval calculation D3.

Figure 13:
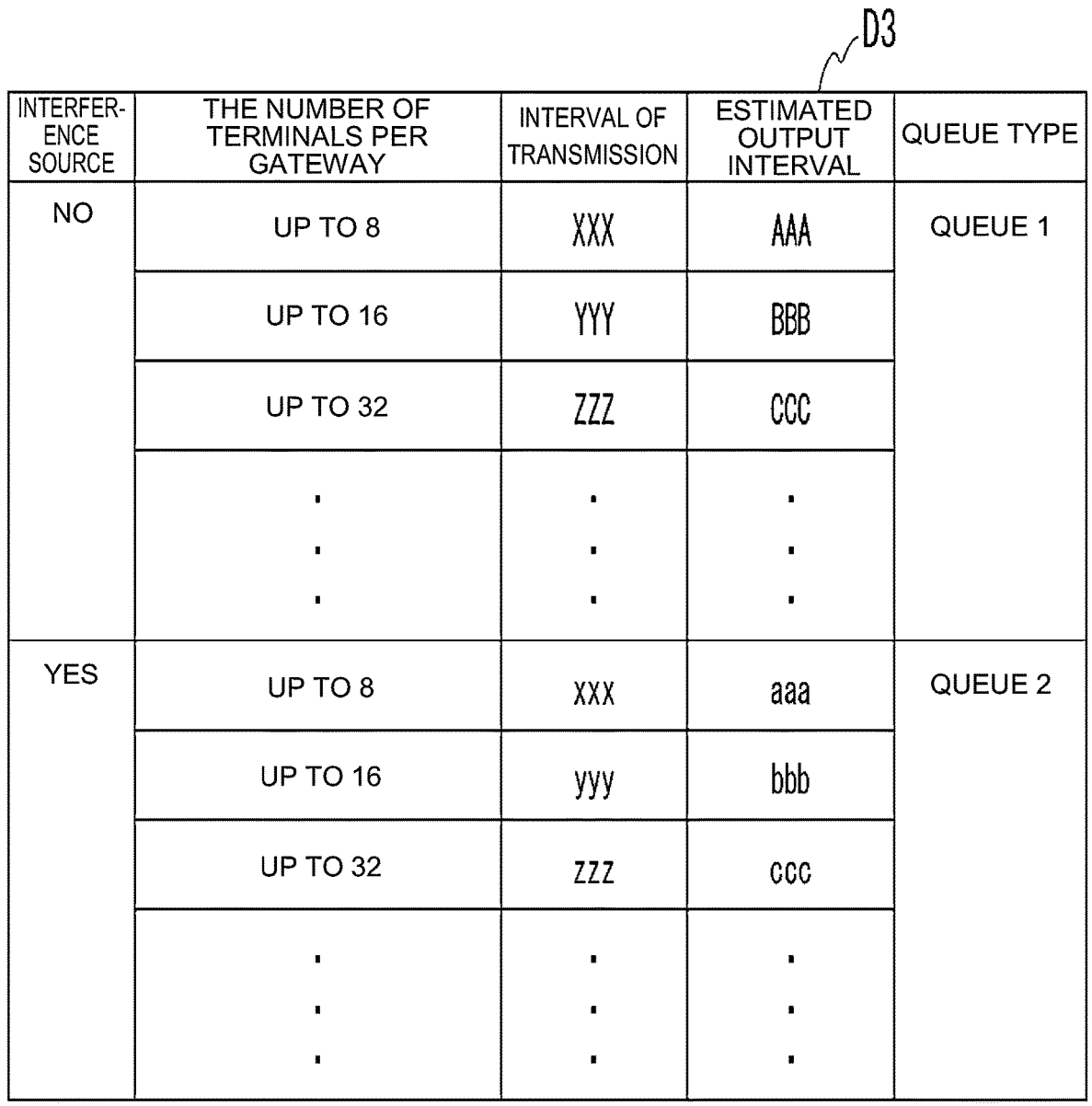
FIG. 13 shows a configuration of a database for transmission interval calculation D3 used by the server 10 according to the first embodiment of the present invention.

FIG. 13 shows the configuration of the database for transmission interval calculation D3 used by the server 10 according to the first embodiment of the present invention. As shown in FIG. 13, the database for transmission interval calculation D3 is data in the form of a table in which information indicating the presence/absence of an interference source, the number of terminals per gateway, the interval of transmission, the estimated output interval, and a queue type are associated with each other. The transmission unit 105 can calculate, on the basis of the estimated output interval and the calculated number of the terminals per gateway 20 recorded in the database for transmission interval calculation D3, the estimated time of completion of output to all the terminals by each of the gateways 20.

[Configuration of Communication Quality Recording Database]

Description will be made below on an example of the table configuration of a communication quality recording database D4.

FIG. 14 shows the configuration of the communication quality recording database D4 used by the server 10 according to the first embodiment of the present invention. As shown in FIG. 14, the communication quality recording database D4 is data in the form of a table in which information identifying the gateways 20, the average loss rate at each of the gateways 20, the terminal ID, and the average loss rate at each of the terminals are associated with each other.

[Configuration of Other System Interference Recording Database]

Figure 15:
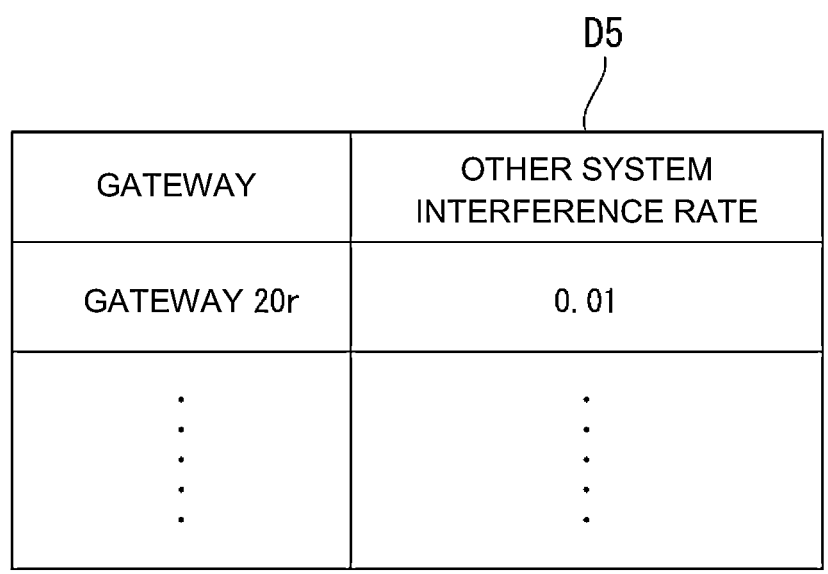
FIG. 15 shows a configuration of another system interference recording database D5 used by the server 10 according to the first embodiment of the present invention.

Description will be made below on an example of the table configuration of another system interference recording database D5. FIG. 15 shows the configuration of the other system interference recording database D5 used by the server 10 according to the first embodiment of the present invention. As shown in FIG. 15, the other system interference recording database D5 is data in the form of a table in which information identifying the gateways 20 and the other system interference rate are associated with each other. The transmission unit 105 can correct the interval of transmission to each of the gateways 20 on the basis of the average loss rate recorded in the communication quality recording database D4 and the value of the other system interference rate recorded in the other system interference recording database D5.

[Another Example of Terminal Group Update Processing]

A further detailed description will be made below on another example of the terminal group update processing performed by the server 10 in step S005 described above.

Figure 16:
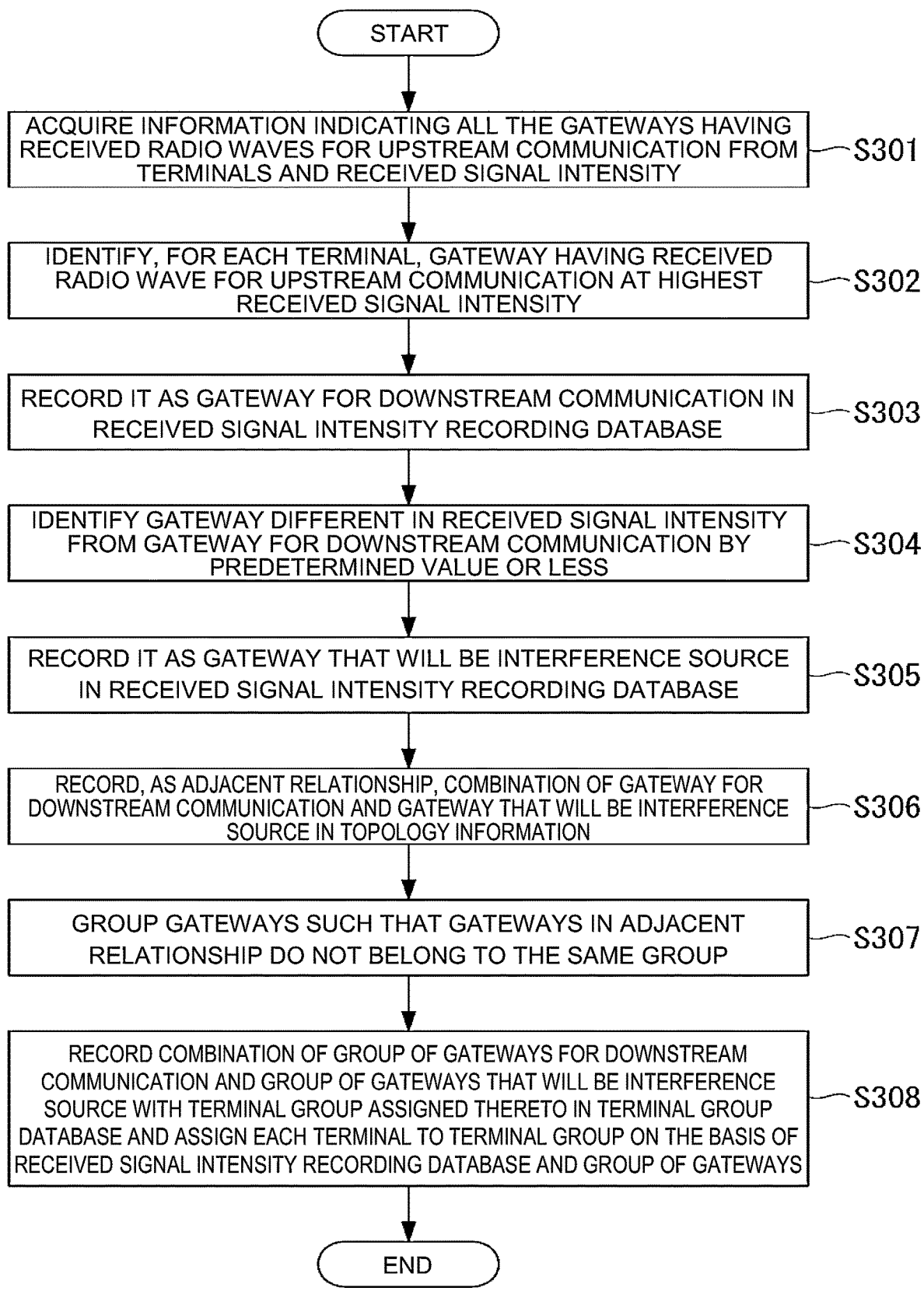
FIG. 16 is a flowchart showing an operation for the terminal group update processing performed by the server 10 according to the first embodiment of the present invention.

FIG. 16 is a flowchart showing an operation for the terminal group update processing performed by the server 10 according to the first embodiment of the present invention.

The terminal classification unit 102 of the server 10 acquires information indicating all the gateways 20 (the gateway 20b and the gateway 20g in FIG. 8) having received radio waves for upstream communication from the terminals and the information indicating the received signal intensity upon reception (step S301). The terminal classification unit 102 identifies one of the gateways 20 having received the radio wave from each of the terminals at the highest received signal intensity on the basis of the acquired information (step S302). The terminal classification unit 102 then records the identified gateway 20 as a gateway for downstream communication to the terminal in the received signal intensity recording database stored in the storage unit 104 (step S303). It should be noted that the table configuration of the received signal intensity recording database is as described with reference to FIG. 10.

The terminal classification unit 102 identifies any other gateway 20 having a received signal intensity that is different from the received signal intensity of the above-described identified gateway 20 for downstream communication by a predetermined value or less (for example, 10 [dB] or less) on the basis of the information indicating all the gateways 20 having received the radio waves for upstream communication from the terminals and the information indicating the received signal intensity upon reception (step S304). When identifying any other the gateway 20 that satisfies the above-described condition, the terminal classification unit 102 records the identified gateway 20 as a gateway that will be an interference source in the received signal intensity recording database D1 (step S305).

The terminal classification unit 102 records a combination of the gateway 20 for downstream communication and the gateway 20 that will be an interference source, which is recorded in the received signal intensity recording database D1, as an adjacent relationship in topology information D6 (step S306). The server 10 groups the gateways 20 such that the gateways 20 in the adjacent relationship do not belong to the same group on the basis of the topology information D6 (step S307). It should be noted that, for example, a typical technique such as a solution of a coloring problem using an ising model can be used for the grouping of the gateways 20. It should be noted that configurations of the topology information D6 and gateway group information D7 will be described later.

The terminal classification unit 102 records a combination of the gateway group of the gateways 20 for downstream communication and the gateway group of the gateways 20 that will be an interference source with the terminal group assigned to the combination in a terminal group database D8. It should be noted that a table configuration of the terminal group database D8 will be described later. The terminal classification unit 102 then assigns the terminal group to each of the terminals on the basis of the received signal intensity recording database D1 and the gateway group information D7 (step S308).

The operation of the terminal classification unit 102 of the server 10 shown in the flowchart of FIG. 16 thus terminates.

[Configuration of Topology Information]

Description will be made below on an example of the configuration of the topology information D6.

Figure 17:
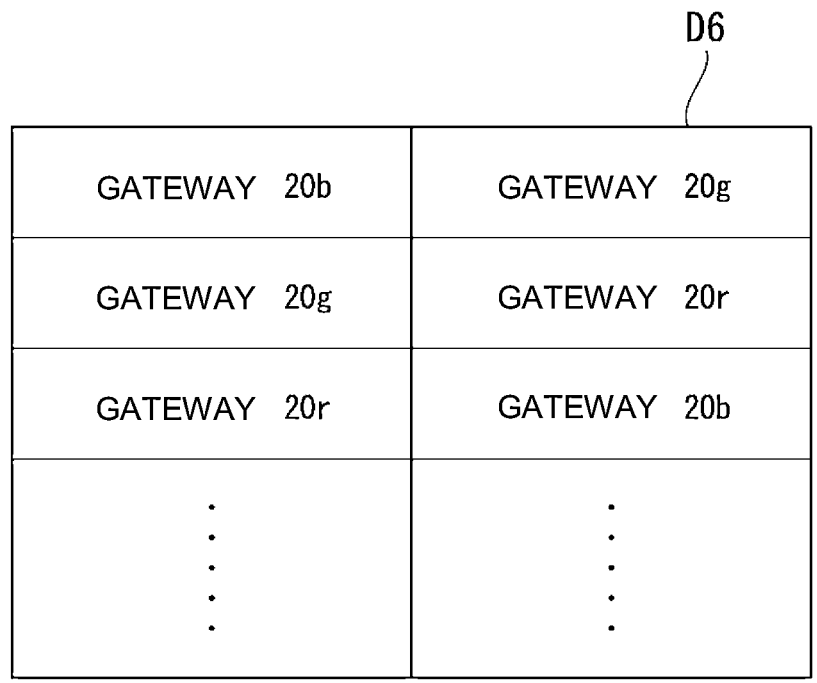
FIG. 17 shows a configuration of the topology information D6 used by the server 10 according to the first embodiment of the present invention.

FIG. 17 shows the configuration of the topology information D6 used by the server 10 according to the first embodiment of the present invention. As shown in FIG. 17, the topology information D6 is data in the form of a table in which information identifying the gateways 20 and information identifying another one of the gateways 20 adjacent to the gateway 20 are associated with each other. The server 10 can group the gateways 20 such that the gateways 20 in the adjacent relationship do not belong to the same group on the basis of the topology information D6.

[Configuration of Gateway Group Information]

Description will be made below on an example of the configuration of the gateway group information D7.

Figure 18:
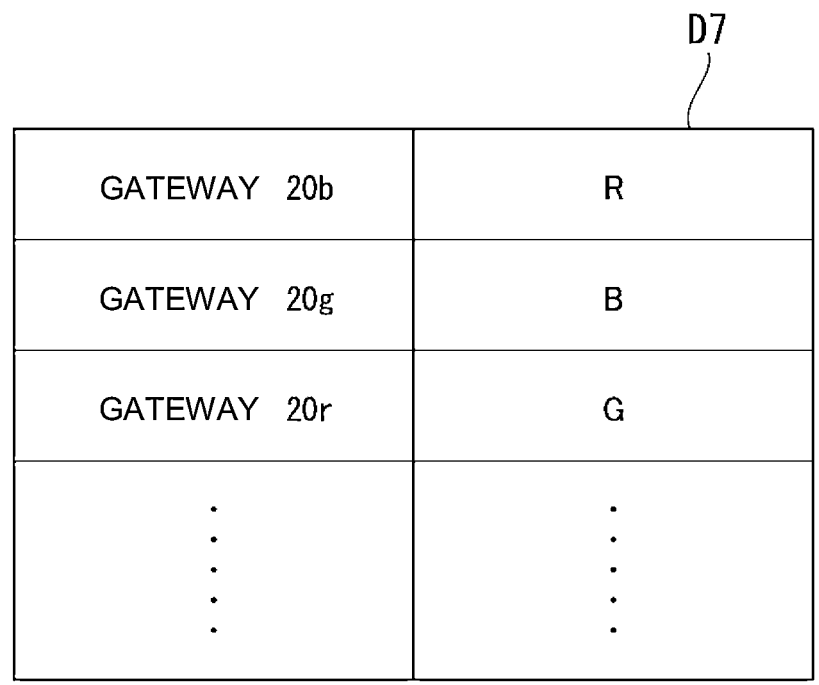
FIG. 18 shows a configuration of gateway group information D7 used by the server 10 according to the first embodiment of the present invention.

FIG. 18 shows the configuration of the gateway group information D7 used by the server 10 according to the first embodiment of the present invention. As shown in FIG. 18, the gateway group information D7 is data in the form of a table in which the information identifying the gateways 20 and information identifying a gateway group to which the gateway 20 belongs are associated with each other.

[Configuration of Terminal Group Database]

Description will be made below on an example of the configuration of the terminal group database D8.

Figure 19:
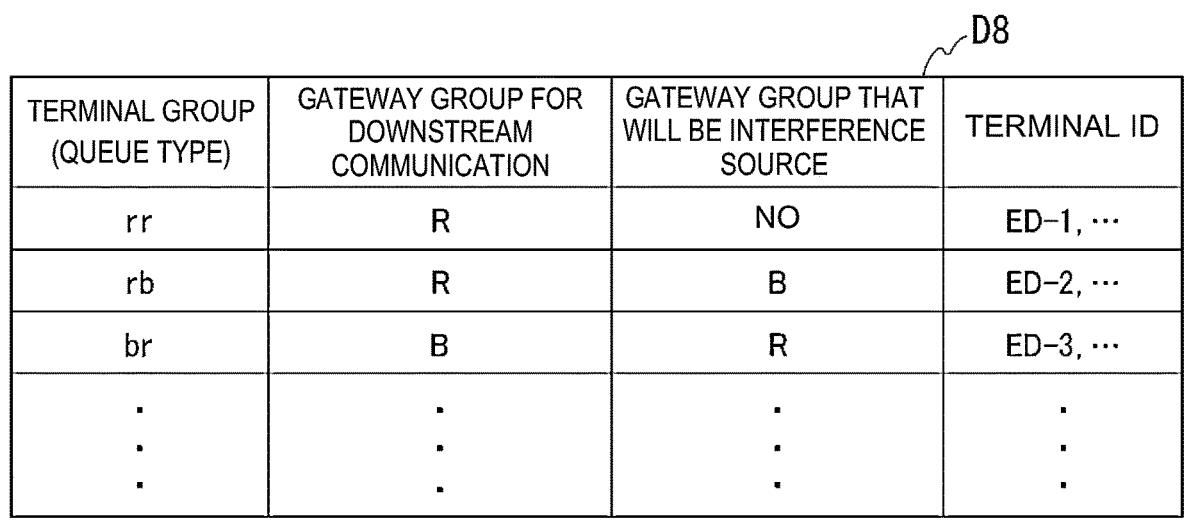
FIG. 19 shows a configuration of a terminal group database D8 used by the server 10 according to the first embodiment of the present invention.

FIG. 19 shows the configuration of the terminal group database D8 used by the server 10 according to the first embodiment of the present invention. As shown in FIG. 19, the terminal group database D8 is data in the form of a table in which information identifying the terminal group, information identifying the gateway group for downstream communication, information identifying the gateway group that will be an interference source, and the terminal ID are associated with each other. The terminal classification unit 102 can assign a terminal group to each of the terminals on the basis of the terminal group database D8, the gateway group information D7, and the received signal intensity recording database D1.

[Operation of Server 10 for Transmission Processing]

Description will be made below on an example of transmission processing of packets performed by the server 10.

Figure 20:
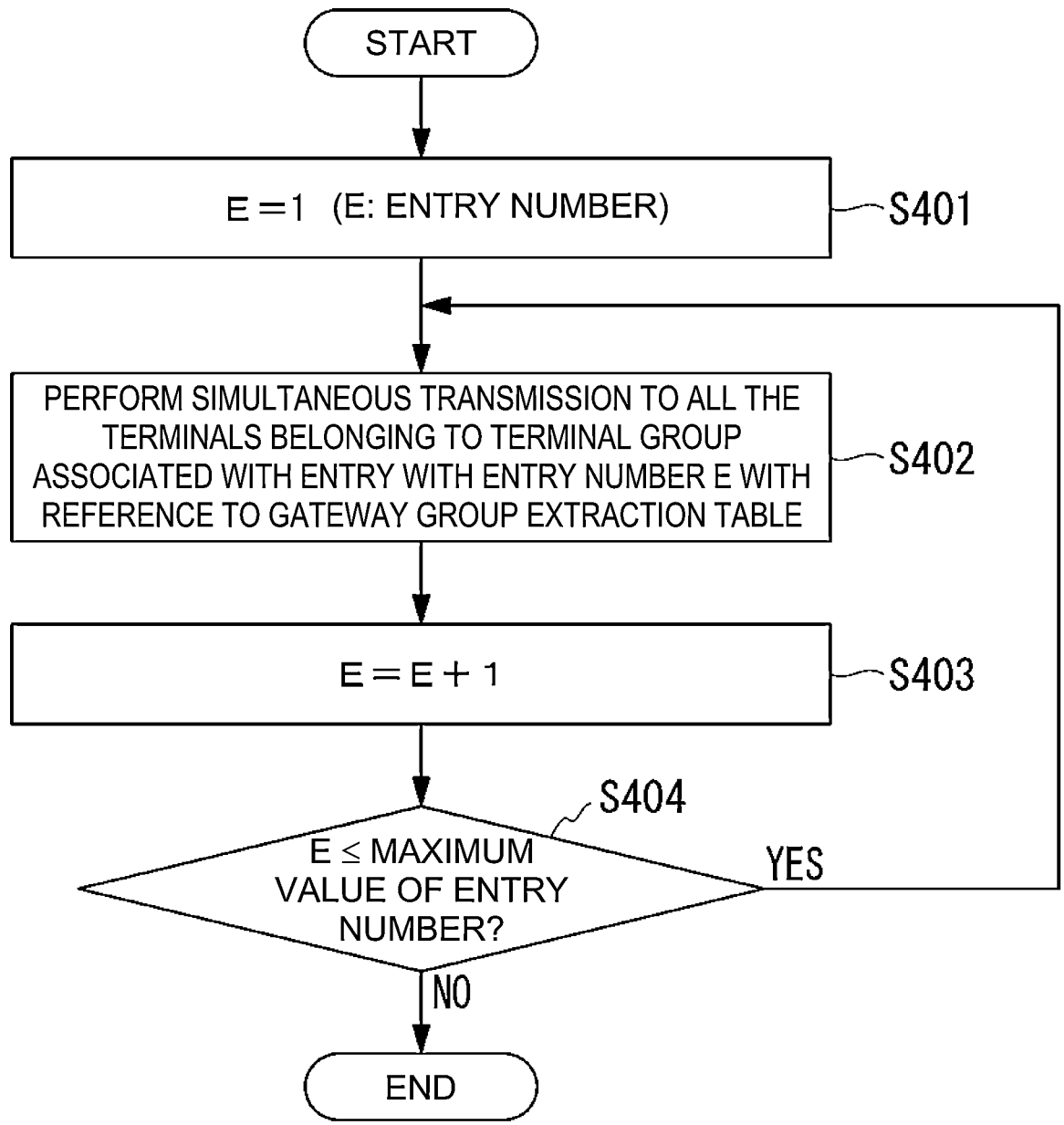
FIG. 20 is a flowchart showing an operation for transmission processing performed by the server 10 according to the first embodiment of the present invention.

FIG. 20 is a flowchart showing an operation for the transmission processing performed by the server 10 according to the first embodiment of the present invention.

First, assuming that E is a variable representing an entry number, the control unit 100 of the server 10 assigns 1 to the variable E (step S401). It should be noted that entry herein refers to information corresponding to each row in a later-described terminal group extraction table, that is, one pattern of information in which information regarding the gateway group (set), information regarding the terminal group (set), etc. are associated with each other. The transmission unit 105 identifies the terminal group associated with the entry number E with reference to a gateway group extraction table D9. It should be noted that a configuration of the gateway group extraction table D9 will be described later. The transmission unit 105 simultaneously transmits packets to the terminals belonging to the identified terminal group (step S402).

The control unit 100 adds one to the variable E representing the entry number (step S403). When the variable E is equal to or less than a maximum value of the entry number, the processing is continued back to step S402. Meanwhile, when the variable E is more than the maximum value of the entry number, the operation of the server 10 shown in the flowchart of FIG. 20 terminates.

[Configuration of Terminal Group Extraction Table]

Description will be made below on an example of the configuration of the terminal group extraction table D9.

FIG. 21 shows the configuration of the terminal group extraction table D9 used by the server 10 according to the first embodiment of the present invention. As shown in FIG. 21, the terminal group extraction table D9 is data in the form of a table in which the entry number, information indicating the presence/absence of an interference source, information identifying the gateway group, and information identifying the terminal group (queue type) are associated with each other.

As described above, the server 10 according to the first embodiment of the present invention is a communication control device that transmits a packet to be transmitted to a terminal to the gateway 20 (the base station) that performs wireless communication with the terminal. The server 10 (the communication control device) includes the terminal classification unit 102 and the transmission unit 105. The terminal classification unit 102 classifies, on the basis of the magnitude of radio wave interference from each of the gateways 20 (the base stations) different from the opposing gateway 20 (the neighboring base station), the plurality of terminals into the first terminal group (terminal set) and the second terminal group (the second terminal set) that is relatively larger in the magnitude of radio wave interference than the first terminal group (the first terminal set). In a case where packets the destinations of which are the terminals belonging to the above-described first terminal group (first terminal set) are to be transmitted to the respective opposing gateways 20 (neighboring base stations) of these terminals, the transmission unit 105 transmits the packets at the same timing, and in a case where packets the destinations of which are the terminals belonging to the above-described second terminal group (second terminal set) are to be transmitted to the respective opposing gateways 20 (neighboring base stations) of these terminals, the transmission unit 105 transmits the packets at timings different from each other.

Additionally, the server 10 according to the first embodiment further includes the base station classification unit 103. The base station classification unit 103 groups the gateways 20 (the base stations) that cause no radio wave interference with each other together. In a case where packets the destinations of which are the terminals belonging to the above-described second terminal group (second terminal set) are to be transmitted to the respective opposing gateways 20 (neighboring base stations) of these terminals, the above-described transmission unit 105 transmits the packets at different timings for each of the grouped gateway groups (the base station sets).

The above-described transmission unit 105 also changes the intervals of transmission of the packets in accordance with at least one of the communication quality during the above-described wireless communication or the magnitude of radio wave interference between the above-described gateways 20 (base stations).

By virtue of the configuration as described above, the server 10 according to the first embodiment enables reducing the amount of time required for communication between the server 10 and each of the terminals.

Second Embodiment

Description will be made below on a second embodiment of the present invention with reference to the drawings.

A communication method according to the second embodiment will be described below in comparison with a typical communication method using retransmission at a randomized transmission timing as in the above-described first embodiment. The typical communication method using retransmission at a randomized transmission timing is as described above with reference to FIG. 4.

Figure 22:
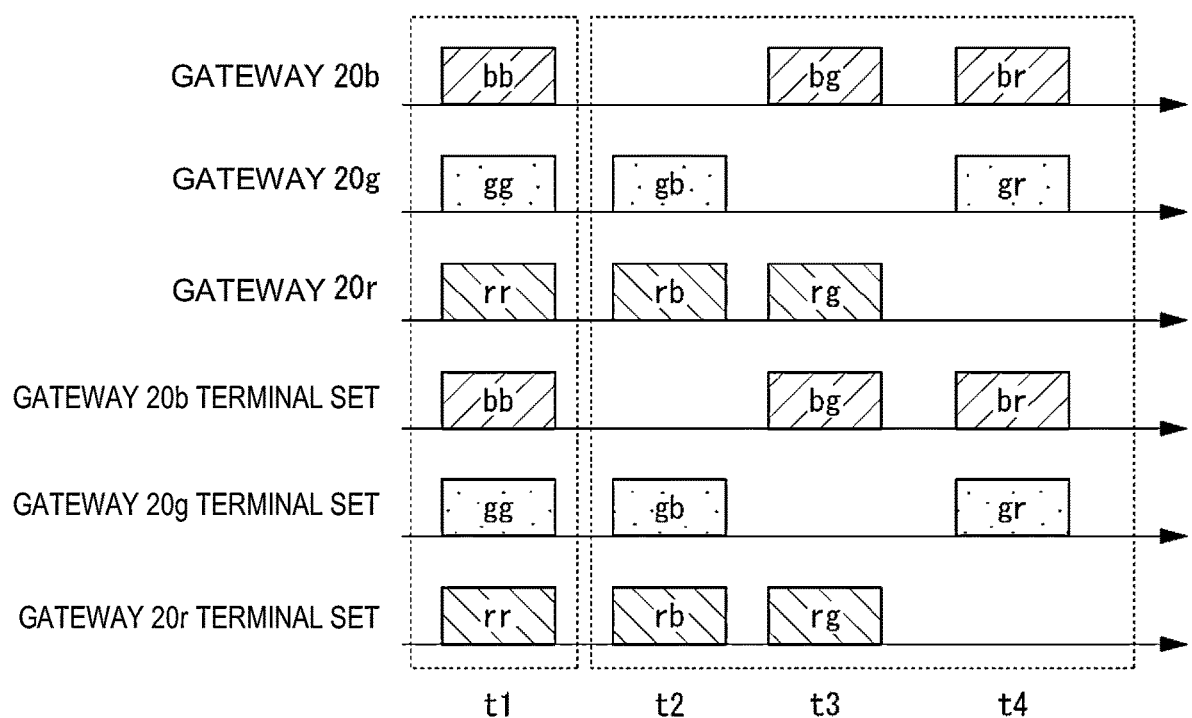
FIG. 22 is a diagram of assistance in explaining a communication method according to a second embodiment of the present invention.

Unlike FIG. 4, FIG. 22, is a diagram of assistance in explaining the communication method according to the second embodiment of the present invention. The server 10 according to the second embodiment first classifies all the target terminals into the non-interference terminals and the interference terminals as in the first embodiment. Then, for example, at the time t1, the server 10 simultaneously transmits packets to be transmitted to the non-interference terminals to the gateways 20. For example, as shown in FIG. 22, the server 10 simultaneously transmits the packet "bb", which is to be transmitted to one of the non-interference terminals, the terminal bb, to the gateway 20b, the packet "gg", which is to be transmitted to another one of the non-interference terminals, the terminal gg, to the gateway 20g, and the packet "rr", which is to be transmitted to still another one of the non-interference terminals, the terminal rr, to the gateway 20r. It should be noted that since all the packets transmitted at the time t1 are packets to be transmitted to the non-interference terminals, no interference occurs at each of the terminals.

Next, the server 10 transmits packets to be transmitted to the interference terminals to the gateways 20. In this regard, in transmitting the packets to the interference terminals, the server 10 transmits the packets according to a schedule instead of simultaneously transmitting the packets to the gateways 20.

For example, as shown in FIG. 22, at the time t2, the server 10 transmits the packet "bg", which is to be transmitted to the terminal gb, that is, the interference terminal that communicates with the gateway 20g and likely to suffer interference from the gateway 20b, to the gateway 20g. Further, in addition to this, at the time t2, the server 10 transmits the packet "rb", which is to be transmitted to the terminal rb, that is, the interference terminal that communicates with the gateway 20r and likely to suffer interference from the gateway 20b, to the gateway 20r.

At the time t2, the server 10 transmits no packet to the gateway 20b (in other words, stops the gateway 20b). Thus, no radio wave is sent from the gateway 20b at the same timing (at the time t), so that the terminal gb can receive the packet "gb" without being affected by interference from the gateway 20b and the terminal rb can receive the packet "rb" without being affected by interference from the gateway 20b.

Subsequently, at the time t2 to a time t4, the server 10 transmits packets to the interference terminals in sequence, while transmitting, at the same timing as the timing at which each of these packets is transmitted, no packet to another gateway 20 that is likely to cause interference to occur (in other words, stopping another gateway 20 that is likely to cause interference to occur) as described above. This allows each of the interference terminals to receive a desired packet without being affected by interference.

As described above, the server 10 according to the second embodiment can make radio wave interference unlikely to occur, allowing for reducing the frequency of the retransmission of packets. This makes communication between the server 10 and each of the terminals more efficient.

Figure 23:
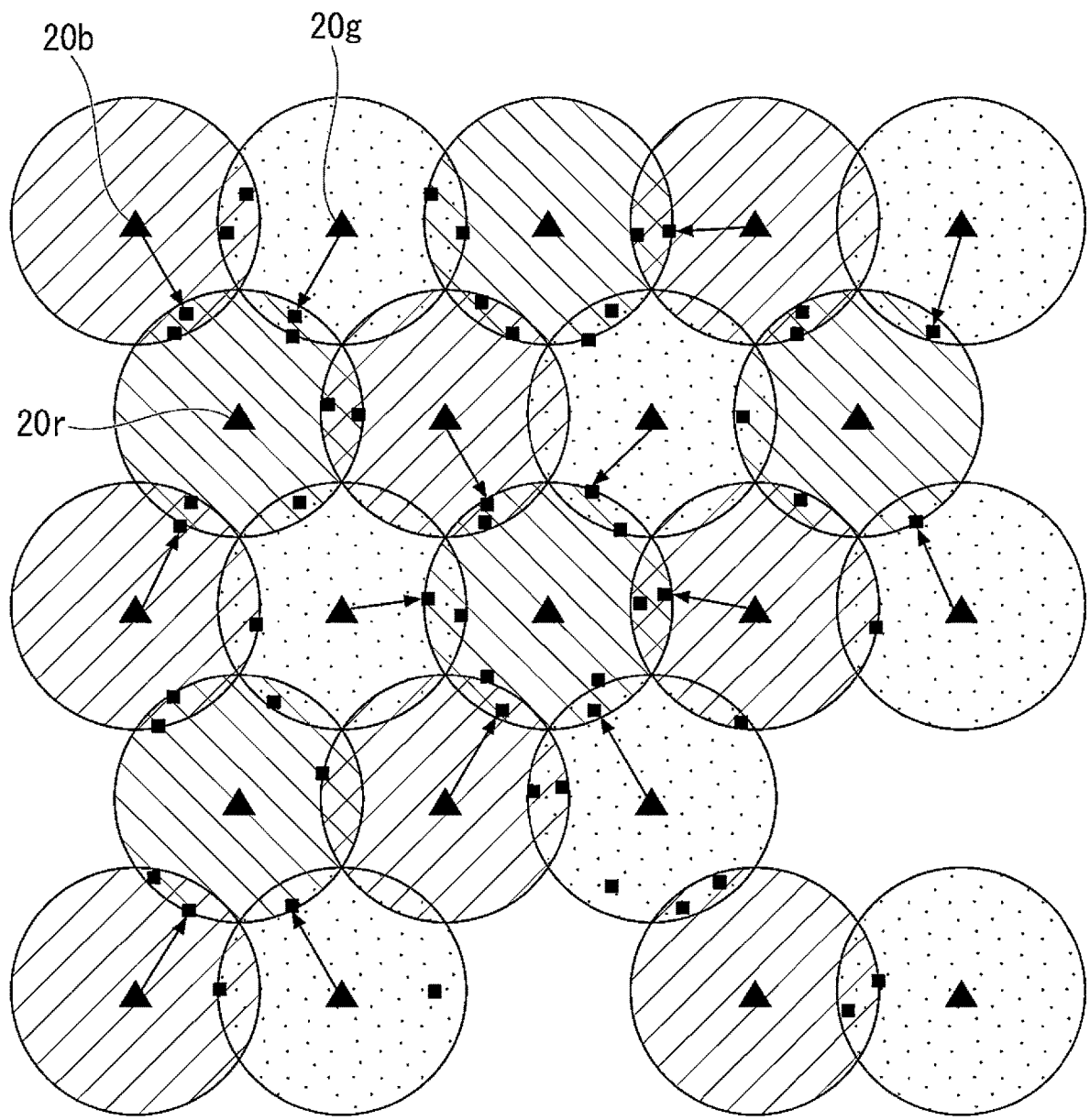
FIG. 23 is a diagram of assistance in explaining a configuration where packets are simultaneously transmitted on a gateway-group basis.

It should be noted that the number of the gateways 20 is usually not three but larger. Accordingly, for example, as shown in FIG. 23, the server 10 classifies the large number of gateways 20 into a gateway group of gateways 20b, a gateway group of gateways 20g, and a gateway group of gateways 20r on the basis of a position relationship between the ranges of the cells. Then, for example, the server 10 first stops communication with the gateway group of gateways 20b, stops communication with the gateway group of gateways 20g at the next transmission timing, and stops communication with the gateway group of gateways 20r at the timing after the next.

[Operation of Server 10 for Transmission Processing]

Description will be made below on an example of transmission processing of packets performed by the server 10.

Figure 24:
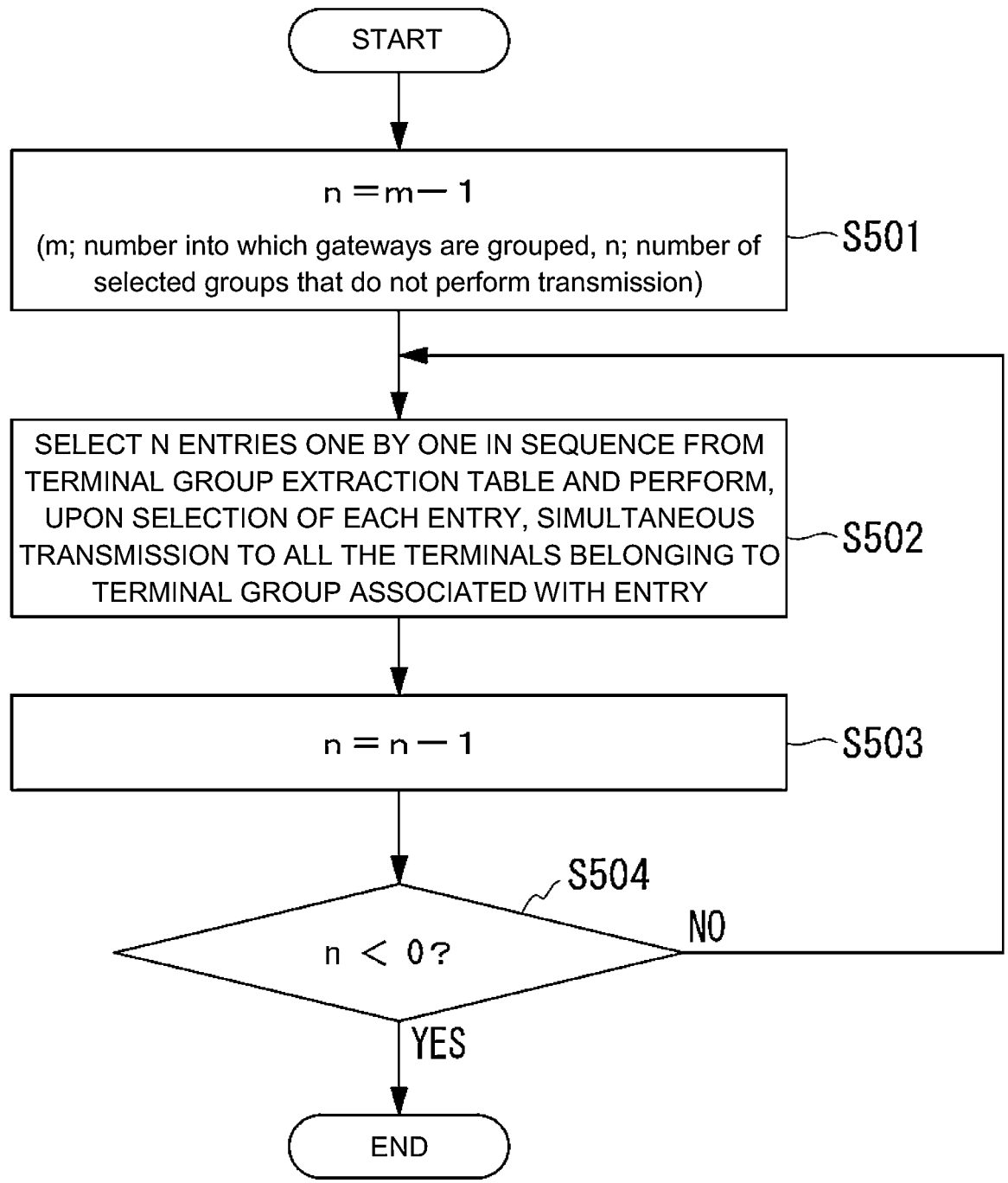
FIG. 24 is a flowchart showing an operation for transmission processing performed by the server 10 according to the second embodiment of the present invention.

FIG. 24 is a flowchart showing an operation for transmission processing performed by the server 10 according to the second embodiment of the present invention.

First, assuming that the number into which the gateways are grouped is m and the number of selected ones of the groups that do not perform transmission is a variable n, the control unit 100 of the server 10 assigns m+1 to the variable n (step S501). The transmission unit 105 selects the variable n entries one by one with reference to a gateway group extraction table D10 and identifies, upon selecting each entry, the terminal group associated with this entry. It should be noted that a configuration of the gateway group extraction table D10 will be described later. The transmission unit 105 simultaneously transmits packets to the terminals belonging to the identified terminal group (step S502).

The control unit 100 subtracts one from the variable n (step S503). When the variable n is zero or larger, the processing is continued back to step S502. Meanwhile, when the variable n is smaller than zero, the operation of the server 10 shown in the flowchart of FIG. 24 terminates.

[Configuration of Terminal Group Extraction Table]

Description will be made below on an example of the configuration of the terminal group extraction table D10.

FIG. 25 shows the configuration of the terminal group extraction table D10 used by the server 10 according to the second embodiment of the present invention. As shown in FIG. 25, the terminal group extraction table D10 is data in the form of a table in which the entry number, the variable n, information identifying the gateway group of the gateways 20 that are to be stopped, information identifying the gateway group of the gateways 20 to which packets are to be transmitted, and information identifying the terminal group (queue type) are associated with each other. The transmission unit 105 can select entries of the variable n one by one with reference to the gateway group extraction table D10 and identify, upon selecting each entry, the terminal group associated with this entry.

As described above, the server 10 according to the second embodiment of the present invention is a communication control device that transmits a packet to be transmitted to a terminal to the gateway 20 (the base station) that performs wireless communication with the terminal. The server 10 (the communication control device) includes the terminal classification unit 102 and the transmission unit 105. The terminal classification unit 102 classifies, on the basis of the magnitude of radio wave interference from each of the gateways 20 (the base stations) different from the opposing gateway 20 (the neighboring base station), the plurality of terminals into the first terminal group (the first terminal set) and the second terminal group (the second terminal set) that is relatively larger in the magnitude of radio wave interference than the first terminal group (the first terminal set). In a case where packets the destinations of which are the terminals belonging to the above-described first terminal group (first terminal set) are to be transmitted to the respective opposing gateways 20 (neighboring base stations) of these terminals, the transmission unit 105 transmits the packets at the same timing, and in a case where packets the destinations of which are the terminals belonging to the above-described second terminal group (second terminal set) are to be transmitted to the respective opposing gateways 20 (neighboring base stations) of these terminals, the transmission unit 105 transmits the packets at timings different from each other.

Additionally, the server 10 according to the second embodiment further includes the base station classification unit 103. The base station classification unit 103 groups the gateways 20 (the base stations) that cause no radio wave interference with each other together. In a case where packets the destinations of which are the terminals belonging to the above-described second terminal group (second terminal set) are to be transmitted to the respective opposing gateways 20 (neighboring base stations) of these terminals, when no packet is transmitted to the gateways 20 (the second base stations) belonging to the first gateway group (first base station set), the above-described transmission unit 105 transmits packets the destinations of which are the terminals that suffer from radio wave interference from the gateways 20 (the base stations) belonging to the above-described first gateway group (first base station set).

By virtue of the configuration as described above, the server 10 according to the second embodiment enables further reducing the amount of time required for communication between the server 10 and each of the terminals.

[Another Example of Terminal Group Update Processing]

The terminal classification unit 102 of the server 10 according to the second embodiment may further have a function to combine two entries into one entry. Specifically, even in a case where any of the gateway groups registered as gateway groups that are to be stopped is selected in either of the two entries, unless it matches any of the gateway groups registered as gateway groups that are to be caused to transmit packets in the other one of the two entries, the terminal classification unit 102 combines the two entries.

A further detailed description will be made below on another example of the terminal group update processing performed by the server 10 in step S005 described above.

Figure 26:
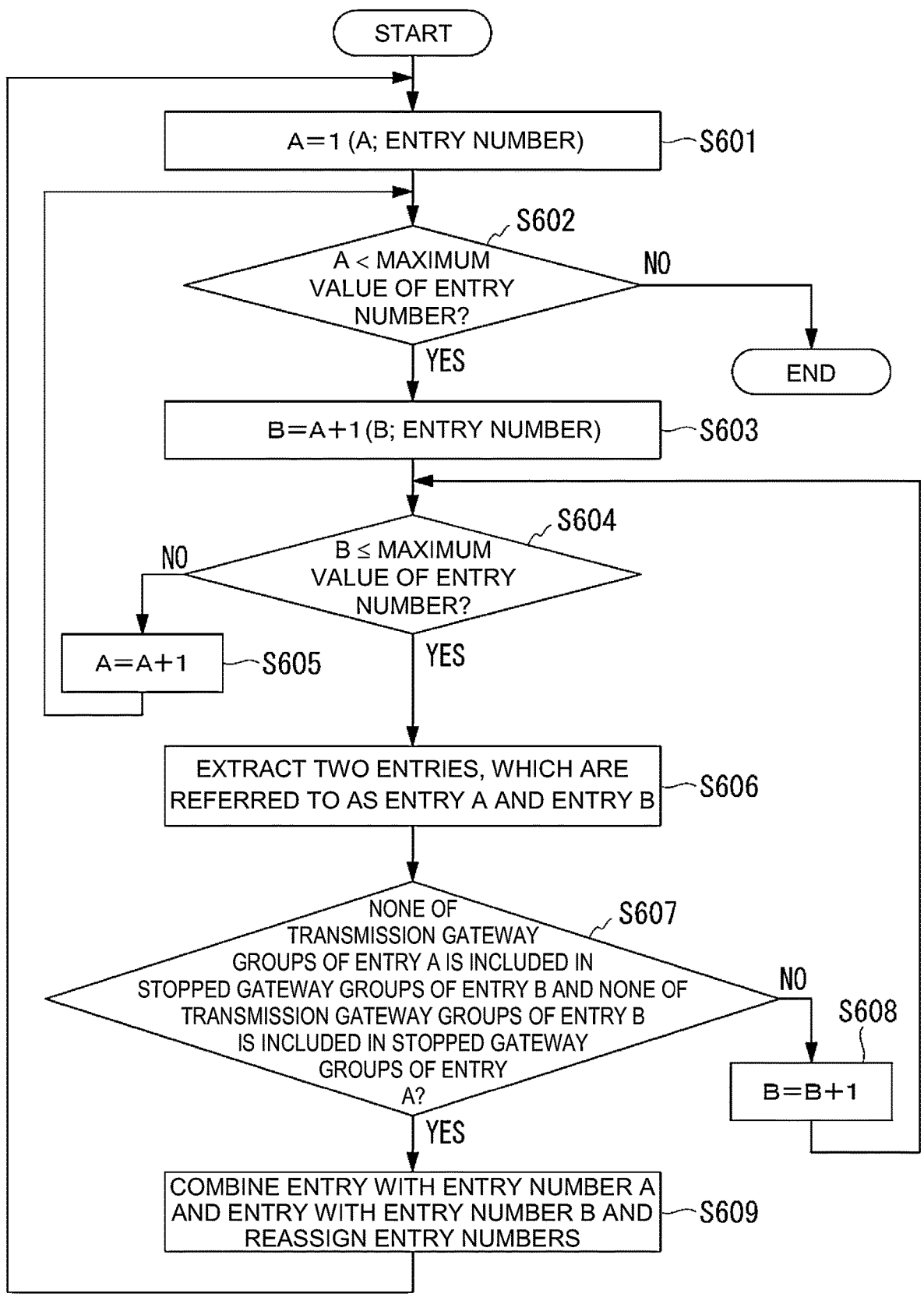
FIG. 26 is a flowchart showing an operation for terminal group update processing performed by the server 10 according to the second embodiment of the present invention.

FIG. 26 is a flowchart showing an operation for the terminal group update processing performed by the server 10 according to the second embodiment of the present invention.

The terminal classification unit 102 selects two entry A and entry B that are different from each other in steps S601 to S606. Then, in step S607, the terminal classification unit 102 determines whether or not none of transmission gateway groups of the entry A is included in stopped gateway groups of the entry B and none of transmission gateway groups of the entry B is included in stopped gateway groups of the entry A. When a determination result is YES in step S607, the terminal classification unit 102 combines the respective stopped gateway groups, respective transmission gateway groups, and respective terminal groups of the entry A and the entry B with each other, forming one entry in step S609. The terminal classification unit 102 then reassigns new entry numbers to all the entries, thereby updating the terminal group extraction table. Afterward, the terminal classification unit 102 returns to step S601.

FIG. 27 shows a terminal group extraction table D11 used by the server 10 according to the second embodiment of the present invention. Meanwhile, FIG. 28 shows a terminal group extraction table D12 after the entries are combined and the entry numbers are reassigned by performing the flowchart of FIG. 26 on D11.

As shown in FIG. 27, in a case where a variable A and a variable B in FIG. 26 are A=2 and B=6, respectively, a determination result is YES in step S607. This is because a transmission gateway group G with an entry number 2 is not included in stopped gateway groups R and C with an entry number 6 and a transmission gateway group B with the entry number 6 is not included in the stopped gateway group R with the entry number 2.

Thus, the terminal classification unit 102 combines the entries with the entry number 2 and the entry number 6 with each other, thereby creating a new entry with an entry number 2'. It should be noted that the uncombined entries with the entry number 2 and the entry number 6 are deleted. The terminal group extraction table D11 shown in FIG. 27 is thus updated to the terminal group extraction table D12 shown in FIG. 28 by performing the processing shown in the flowchart of FIG. 26.

By virtue of the configuration described above, the server 10 according to the second embodiment increases the number of gateways allowed to simultaneously perform communication, thus making it possible to further reduce the amount of time required for communication between the server 10 and each of the terminals.

Third Embodiment

Description will be made below on a third embodiment of the present invention with reference to the drawings.

In the second embodiment, the description is made on the configuration where the gateways 20 that are likely to cause interference to occur are stopped in sequence, thereby reducing the occurrence of interference. However, each of the gateways 20 that are likely to cause interference to occur is not necessarily stopped but may be caused to perform communication with a transmission power reduced to a level at which no interference occurs. Instead of stopping each of the gateways 20 that are likely to cause interference to occur, a server 10b according to the third embodiment selects, from among terminals near the gateway 20 that is likely to cause interference to occur, a terminal with an especially high received signal intensity as a destination and causes the gateway 20 to perform communication with a transmission power for a radio wave transmitted from the gateway 20 reduced.

Figure 29:
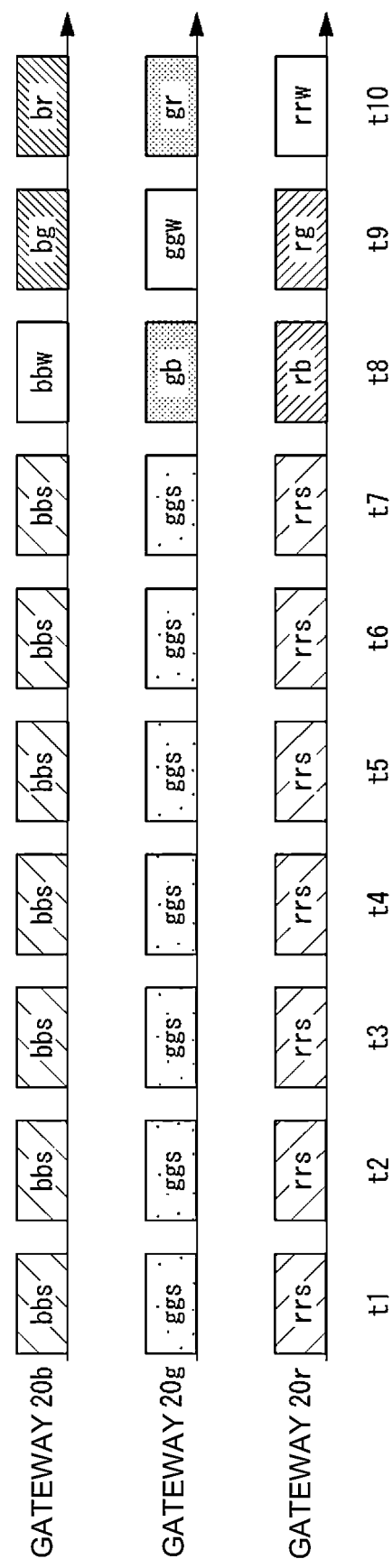
FIG. 29 is a diagram of assistance in explaining a communication method according to a third embodiment of the present invention.

FIG. 29 is a diagram of assistance in explaining a communication method according to the third embodiment of the present invention. The server 10b according to the third embodiment first classifies all the target terminals into the non-interference terminals and the interference terminals. Further, the server 10b classifies the non-interference terminals into a terminal with an especially high received signal power and the other terminals. For example, the server 10b may perform the above-described classification on the basis of whether or not a value of the received signal power is equal to or more than a predetermined threshold.

In FIG. 29, "bbw" denotes a packet to be transmitted to a terminal "bbw", which is a terminal with an especially high received signal power among the non-interference terminals that communicate with the gateway 20b. Likewise, "ggw" and "rrw" denote packets to be transmitted to a terminal "bbw" and a terminal "rrw", which are terminals with especially high received signal powers among the non-interference terminals that communicate with the gateway 20g and the gateway 20r, respectively.

Further, in FIG. 29, "bbs" denotes packets to be transmitted to, among the non-interference terminals that communicate with the gateway 20b, the terminals other than the above-described terminal "bbw". Likewise, "ggw" and "rrw" denote packets to be transmitted to, among the non-interference terminals that communicate with the gateway 20g and the gateway 20r, the terminals other than the above-described terminal "bbw" and terminal "rrw", respectively.

Further, in FIG. 29, "bg", "br", "gb", "gr", "rb", and "rg" are as described in the first embodiment. In other words, for example, "bg" is a packet to be transmitted to the terminal bg. Further, the terminal bg is a terminal the neighboring base station of which is the gateway 20b and that is located in the overlapping area between the range of the cell defined by the gateway 20b and the range of the cell defined by the gateway 20g. The terminal bg is thus one of the interference terminals that are likely to be affected by interference from the gateway 20g.

The server 10b first simultaneously transmits packets to be transmitted to a terminal group of the non-interference terminals excluding a terminal with an especially high received signal power to each of the gateways 20. For example, as shown in FIG. 29, at the time tl to the time t7, the server 10b transmits the packets "bbs", which are to be transmitted to terminals bbs, that is, a terminal group excluding the terminal bbw with an especially high received signal power among the non-interference terminals that communicate with the gateway 20b, to the gateway 20b.

Likewise, for example, as shown in FIG. 29, at the time tl to the time t7, the server 10b simultaneously transmits a packet "ggs" and a packet "rrs", which are to be transmitted to terminals ggs and terminals rrs, that is, terminal groups excluding the terminal ggw and the terminal rrw with especially high received signal powers among the non-interference terminals that communicate with the gateway 20g and the gateway 20r, to the gateway 20g and the gateway 20r, respectively. It should be noted that since all the packets transmitted at the time t1 to the time t7 are packets to be transmitted to the non-interference terminals, no interference occurs at each of the terminals.

Next, at a time t8, the server 10b transmits, to the gateway 20b, instructions for causing the gateway 20b to perform communication with a transmission power reduced to a level at which no interference occurs at the interference terminals and transmits the packet "bbw" to be transmitted to the terminal bbw with an especially high received signal power. In addition to this, at the time t8, the server 10b transmits the packet "gb" to be transmitted to the terminal gb, which is the interference terminal, to the gateway 20g. Further, in addition to this, at the time t8, the server 10b transmits the packet "rb" to be transmitted to the terminal rb, which is the interference terminal, to the gateway 20r.

Next to the above, at a time t9, the server 10b transmits, to the gateway 20g, instructions for causing the gateway 20g to perform communication with a transmission power reduced to a level no interference occurs at the interference terminals and transmits the packet "ggw" to be transmitted to the terminal ggw with an especially high received signal power in a similar manner to the above. In addition to this, at the time t9, the server 10b transmits the packet "bg" to be transmitted to the terminal bg, which is the interference terminal, to the gateway 20b. Further, in addition to this, at the time t9, the server 10b transmits the packet "rg" to be transmitted to the terminal rg, which is the interference terminal, to the gateway 20r.

Further, next to the above, at a time t10, the server 10b transmits, to the gateway 20r, instructions for causing the gateway 20r to perform communication with a transmission power reduced to a level at which no interference occurs at the interference terminals and transmits the packet "rrw" to be transmitted to the terminal rrw with an especially high received signal power in a similar manner to the above. In addition to this, at the time t10, the server 10b transmits the packet "br" to be transmitted to the terminal br, which is the interference terminal, to the gateway 20b. Further, in addition to this, at the time t10, the server 10b transmits the packet "gr" to be transmitted to the terminal gr, which is the interference terminal, to the gateway 20g.

As described above, the server 10b according to the third embodiment can make radio wave interference unlikely to occur, allowing for reducing the frequency of the retransmission of packets. This makes communication between the server 10b and each of the terminals more efficient.

Figure 30:
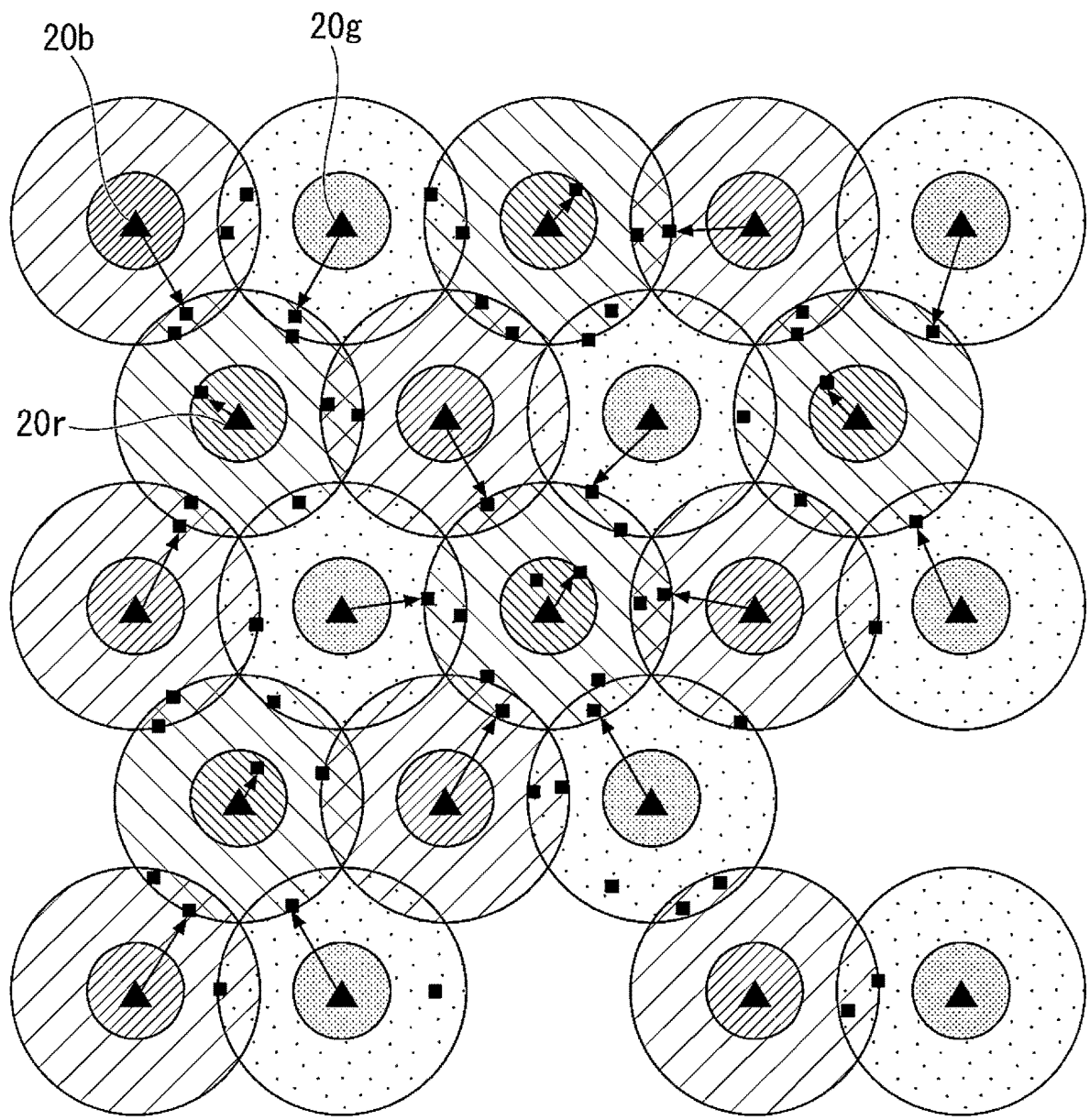
FIG. 30 is a diagram of assistance in explaining a configuration where packets are simultaneously transmitted on a gateway-group basis.

It should be noted that the number of the gateways 20 is usually not three but larger. Accordingly, for example, as shown in FIG. 30, the server 10b classifies the large number of gateways 20 into a gateway group of gateways 20b, a gateway group of gateways 20g, and a gateway group of gateways 20r on the basis of a position relationship between the ranges of the cells. Then, for example, the server 10b first causes the gateway group of the gateways 20b to perform communication with a transmission power reduced, causes the gateway group of gateways 20g to perform communication with a transmission power reduced at the next transmission timing, and causes the gateway group of the gateways 20r to perform communication with a transmission power reduced at the timing after the next.

[Functional Configuration of Server]

Description will be made below on a functional configuration of the server 10b.

Figure 31:
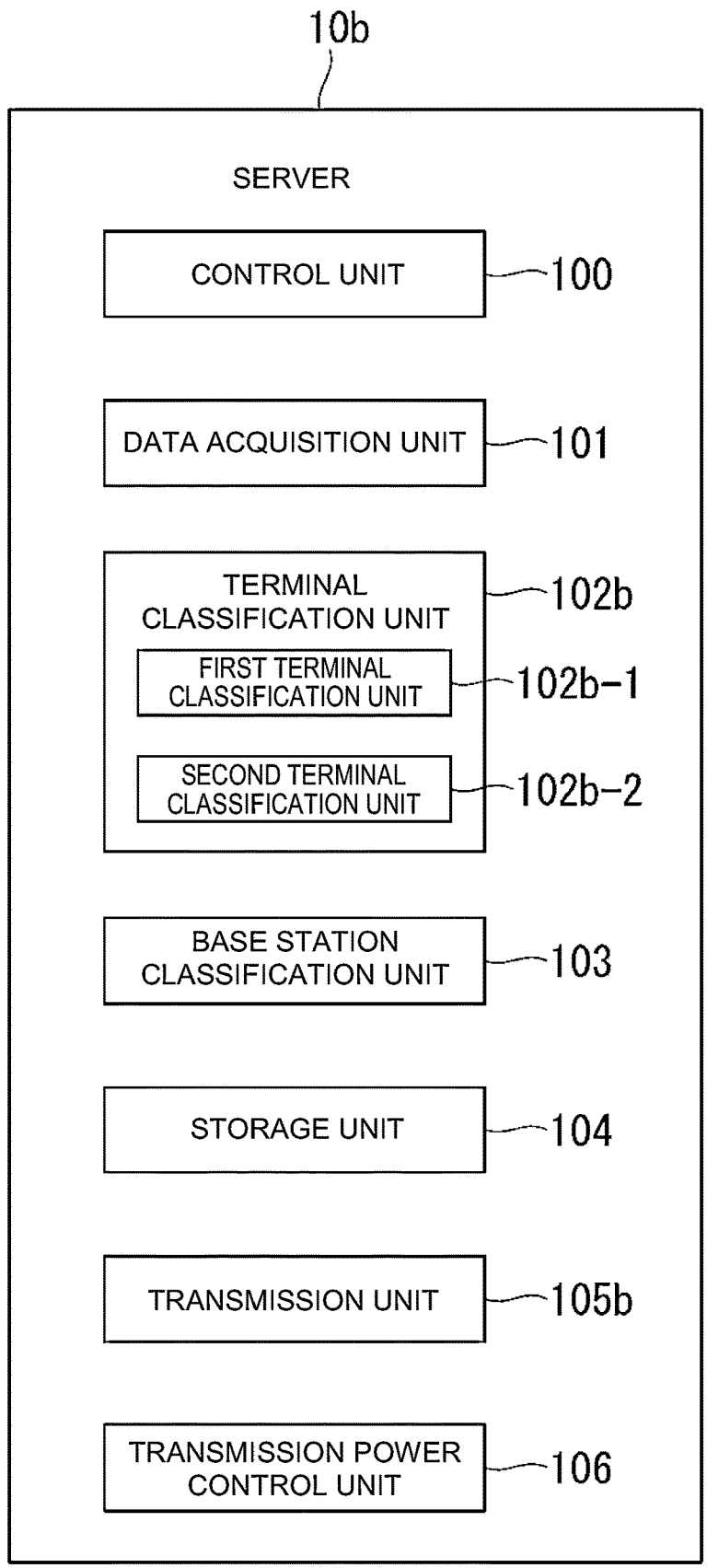
FIG. 31 is a block diagram showing a functional configuration of the server 10 according to the third embodiment of the present invention.

FIG. 31 is a block diagram showing the functional configuration of the server 10b according to the third embodiment of the present invention.

The server 10b is a communication control device that transmits a packet to be transmitted to a terminal to the gateway 20 (the base station) that performs wireless communication with the terminal. The server 10b is, for example, an information processing device such as a general-purpose computer.

As shown in FIG. 31, the server 10b includes the control unit 100, the data acquisition unit 101, a terminal classification unit 102b, the base station classification unit 103, the storage unit 104, a transmission unit 105b, and a transmission power control unit 106. Further, the terminal classification unit 102b includes a first terminal classification unit 102b-1 and a second terminal classification unit 102b-2. It should be noted that the same reference signs are used to refer to functional units with functions equivalent to those of the functional units of the server 10 according to the first embodiment described with reference to FIG. 7 and the description thereof is omitted below.

The first terminal classification unit 102b-1 classifies, on the basis of the magnitude of radio wave interference from each of the gateways 20 (the base stations) different from the opposing gateway 20 (the neighboring base station), a plurality of terminals into a first terminal group (a first terminal set: a terminal group of non-interference terminals) and a second terminal group (a second terminal set: a terminal group of non-interference terminals) that is relatively larger in magnitude of radio wave interference than the first terminal group.

The second terminal classification unit 102b-2 classifies, on the basis of a received signal intensity of a radio wave from the opposing gateway 20 (the neighboring base station), the plurality of terminals of the first terminal group into a third terminal group (a third terminal set: a terminal group with the terminals of a fourth terminal group excluded from the terminals of the terminal group of the non-interference terminals) and the fourth terminal group (a fourth terminal set: a terminal group of terminals with an especially high received signal intensity among the terminals of the terminal group of the non-interference terminals) that is relatively higher in the received signal intensity than the third terminal group (the third terminal set).

In a case where packets the destinations of which are terminals belonging to the fourth terminal group (the fourth terminal set) are to be transmitted, the transmission power control unit 106 reduces a transmission power for a radio wave from each of the opposing gateways 20 (the neighboring base stations) of the terminals.

In a case where packets the destinations of which are terminals belonging to the third terminal group (the third terminal set) are to be transmitted to the respective opposing gateways 20 (neighboring base stations) of the terminals, the transmission unit 105*b* transmits the packets at the same timing. In a case where packets the destinations of which are terminals belonging to the second terminal group (the second terminal set) are to be transmitted to the respective opposing gateways 20 (neighboring base stations) of the terminals, the transmission unit 105*b* transmits the packets at timings different from each other while transmitting the packets the destinations of which are terminals belonging to the fourth terminal group (the fourth terminal set) to the respective opposing gateways 20 (neighboring base stations) of the terminals.

[Operation of Server 10*b* for Transmission Processing]

For example, processing similar to the transmission processing described with reference to FIG. 24 in the second embodiment can be used as transmission processing of packets performed by the server 10*b* according to the third embodiment.

[Configuration of Terminal Group Extraction Table]

Description will be made below on an example of the configuration of the terminal group extraction table D13.

FIG. 32 shows the configuration of the terminal group extraction table D13 used by the server 10*b* according to the third embodiment of the present invention.

As shown in FIG. 32, the terminal group extraction table D13 is data in the form of a table in which an entry number, a variable n, information identifying a gateway group of the gateways 20 to be reduced in transmission power (low-powered), information identifying a gateway group of the gateways 20 not to be reduced in transmission power (high-powered), information identifying a terminal group (queue type) corresponding to the gateway group of the gateways 20 to be low-powered, and information identifying a terminal group (queue type) corresponding to the gateway group of the gateways 20 to be high-powered are associated with each other.

As described above, the server 10*b* according to the third embodiment of the present invention is a communication control device that transmits a packet to be transmitted to a terminal to the gateway 20 (the base station) that performs wireless communication with the terminal. The server 10*b* (the communication control device) includes the first terminal classification unit 102*b*-1, the second terminal classification unit 102*b*-2, the transmission power control unit 106, and the transmission unit 105*b*. The first terminal classification unit 102*b*-1 classifies, on the basis of the magnitude of radio wave interference from each of the gateways 20 (the base stations) different from the opposing gateway 20 (the neighboring base station), the plurality of terminals into the first terminal group (the first terminal set) and the second terminal group (the second terminal set) that is relatively larger in the magnitude of radio wave interference than the first terminal group (the first terminal set). The second terminal classification unit 102*b*-2 classifies, on the basis of a received signal intensity of a radio wave from the opposing gateway 20 (the neighboring base station), the plurality of terminals of the first terminal group (the first terminal set) into the third terminal group (the third terminal set) and the fourth terminal group (the fourth terminal set) that is relatively higher in the received signal intensity than the third terminal group (the third terminal set). In a case where packets the destinations of which are terminals belonging to the fourth terminal group (the fourth terminal set) are to be transmitted, the transmission power control unit 106 reduces a transmission power for a radio wave from each of the opposing gateways 20 (the neighboring base stations) of the terminals. In a case where packets the destinations of which are terminals belonging to the third terminal group (the third terminal set) are to be transmitted to the respective opposing gateways 20 (neighboring base stations) of the terminals, the transmission unit 105*b* transmits the packets at the same timing, and in a case where packets the destinations of which are terminals belonging to the second terminal group (the second terminal set) are to be transmitted to the respective opposing gateways 20 (neighboring base stations) of the terminals, the transmission unit 105*b* transmits the packets at timings different from each other while transmitting the packets the destinations of which are terminals belonging to the fourth terminal group (the fourth terminal set) to the respective opposing gateways 20 (neighboring base stations) of the terminals.

By virtue of the configuration as described above, the server 10*b* according to the third embodiment enables further reducing the amount of time required for communication between the server 10 and each of the terminals.

The server 10 and the server 10*b* in above-described embodiments may be partially or wholly implemented by a computer. In this case, the server 10 and the server 10*b* may each be implemented by recording a program for implementing this function in a computer-readable recording medium and causing a computer system to read and execute the program recorded in the recording medium. It should be noted that the "computer system" herein includes hardware such as OS and peripheral equipment. Further, the "computer-readable recording medium" refers to any one of portable media such as a flexible disk, a magneto-optical disk, a ROM, and a CD-ROM and storage devices such as a hard disk built in the computer system. In addition, the "computer-readable recording medium" may also include a medium that dynamically holds the program for a short period, such as a communication wire for transmitting the program through a network such as the Internet or a communication line such as a phone line and, in this case, a medium that holds the program for a certain period of time, such as a volatile memory within a server or a client, i.e., the computer system. Further, the above-described program may be intended to implement a part of the above-described function. Further, the above-described program may be configured to implement the above-described function in combination with a program having been recorded in the computer system or may be implemented with use of hardware such as a PLD (Programmable Logic Device) or an FPGA (Field Programmable Gate Array).

The embodiments of the present invention are described above with reference to the drawings, but the above-described embodiments are merely examples of the present invention and it is clear that the present invention is by no means limited to the above-described embodiments. Accordingly, addition, omission, replacement, and any other alteration of the components may be performed without departing from the technical idea and the scope of the present invention.

REFERENCE SIGNS LIST

1 . . . communication control system, 10, 10b . . . server, 20 . . . gateway, 100 . . . control unit, 101 . . . data acquisition unit, 102, 102b . . . terminal classification unit, 102b-1 . . . first terminal classification unit, 102b-2 . . . second terminal classification unit, 103 . . . base station classification unit, 104 . . . storage unit, 105 . . . transmission unit, 106 . . . transmission power control unit

The invention claimed is:

1. A communication control device that transmits a packet to be transmitted to a terminal to a base station that performs wireless communication with the terminal, the communication control device comprising:
    a processor; and
    a storage medium having computer program instructions stored thereon, when executed by the processor, perform to:
        classify, on a basis of a magnitude of radio wave interference from a base station different from a neighboring base station, a plurality of the terminals into a first terminal set and a second terminal set that is relatively larger in the magnitude of radio wave interference than the first terminal set,
        a base station being a neighboring base station to a terminal when the terminal is within a range of a cell defined by the neighboring base station; and
        transmit, in a case where packets destinations of which are terminals belonging to the first terminal set are to be transmitted to respective neighboring base stations of the terminals, the packets at a same timing; and
        transmit, in a case where packets destinations of which are terminals belonging to the second terminal set are to be transmitted to respective neighboring base stations of the terminals, the packets at timings different from each other.

2. The communication control device according to claim 1, wherein the computer program instructions further perform to group base stations that cause no radio wave interference with each other together, and
    in the case where the packets the destinations of which are the terminals belonging to the second terminal set are to be transmitted to the respective neighboring base stations of the terminals, transmit the packets at different timings for grouped base station sets.

3. The communication control device according to claim 1, wherein the computer program instructions further perform to group base stations that cause no radio wave interference with each other together, and
    in the case where the packets the destinations of which are the terminals belonging to the second terminal set are to be transmitted to the respective neighboring base stations of the terminals, when transmitting no packet to a base station belonging to a first base station set, transmit a packet a destination of which is a terminal that suffers radio wave interference from the base station belonging to the first base station set.

4. The communication control device according to claim 1, wherein
    the instructions, when executed, further perform to change intervals of transmission of the packets in accordance with at least one of a communication quality during the wireless communication or the magnitude of radio wave interference between the base stations.

5. A communication control method of transmitting a packet to be transmitted to a terminal to a base station that performs wireless communication with the terminal, the communication control method comprising:
    a terminal classification step of classifying, on a basis of a magnitude of radio wave interference from a base station different from a neighboring base station, a plurality of the terminals into a first terminal set and a second terminal set that is relatively larger in the magnitude of radio wave interference than the first terminal set,
    a base station being a neighboring base station to a terminal when the terminal is within a range of a cell defined by the neighboring base station; and
    a transmission step of transmitting, in a case where packets destinations of which are terminals belonging to the first terminal set are to be transmitted to respective neighboring base stations of the terminals, the packets at a same timing and transmits, in a case where packets destinations of which are terminals belonging to the second terminal set are to be transmitted to respective neighboring base stations of the terminals, the packets at timings different from each other.

6. A non-transitory computer-readable medium having computer-executable instructions that, upon execution of the instructions by a processor of a computer, perform to:
    Classify, on a basis of a magnitude of radio wave interference from a base station different from a neighboring base station, a plurality of the terminals into a first terminal set and a second terminal set that is relatively larger in the magnitude of radio wave interference than the first terminal set,
    a base station being a neighboring base station to a terminal when the terminal is within a range of a cell defined by the neighboring base station; and
    transmit, in a case where packets destinations of which are terminals belonging to the first terminal set are to be transmitted to respective neighboring base stations of the terminals, the packets at a same timing and
    transmit, in a case where packets destinations of which are terminals belonging to the second terminal set are to be transmitted to respective neighboring base stations of the terminals, the packets at timings different from each other.

* * * * *